United States Patent [19]
Yokota

[11] Patent Number: 5,276,760
[45] Date of Patent: Jan. 4, 1994

[54] OPTICAL DEVICE FOR PHOTOGRAPHING IMAGES FORMED FROM OPTICAL FIBER BUNDLES

[75] Inventor: Akira Yokota, Kanagawa, Japan

[73] Assignee: Olympus Optical Co., Ltd., Tokyo, Japan

[21] Appl. No.: 717,343

[22] Filed: Jun. 18, 1991

[51] Int. Cl.$^5$ .............................................. G02B 6/06
[52] U.S. Cl. ............................... 385/119; 358/98; 359/779; 385/117
[58] Field of Search .......... 359/498, 774; 385/116, 385/117, 119; 358/98, 901

[56] References Cited

U.S. PATENT DOCUMENTS

| | | | |
|---|---|---|---|
| 4,403,837 | 9/1983 | Nakahashi | 385/119 X |
| 4,449,794 | 5/1984 | Yamada | 359/779 |
| 4,664,486 | 5/1987 | Landre et al. | 385/119 X |
| 4,747,661 | 5/1988 | Ohkuwa | 385/119 X |
| 4,807,026 | 2/1989 | Nishioka et al. | 358/98 |
| 4,824,205 | 4/1989 | Yamashita et al. | 385/119 X |
| 4,859,042 | 8/1989 | Tanaka | 359/684 |
| 4,862,873 | 9/1989 | Yajima et al. | 385/117 X |
| 4,977,450 | 12/1990 | Yokota | 358/98 |
| 5,005,943 | 4/1991 | Fort | 385/117 |

FOREIGN PATENT DOCUMENTS 58-66911 4/1983 Japan.
62-285454 12/1987 Japan.

Primary Examiner—John D. Lee
Attorney, Agent, or Firm—Cushman, Darby & Cushman

[57] ABSTRACT

An imaging optical system which is designed so as to be connecatable and disconnectable to and from an image guide, and arranged in a camera control unit. This imaging optical system is arranged between an image guide attached to the camera control unit and an image pickup device accommodated in the camera control unit in a condition integrated with said members, equipped with no eyepiece lens, used exclusively with a monitor TV and designed as a zoom lens system.

12 Claims, 20 Drawing Sheets

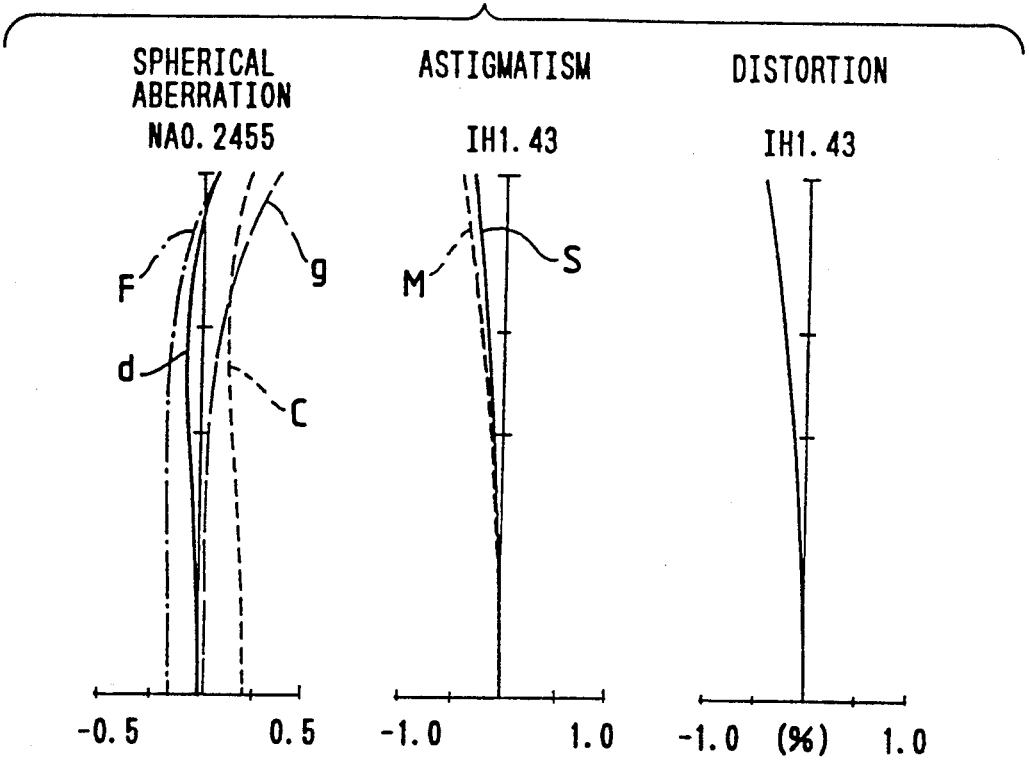
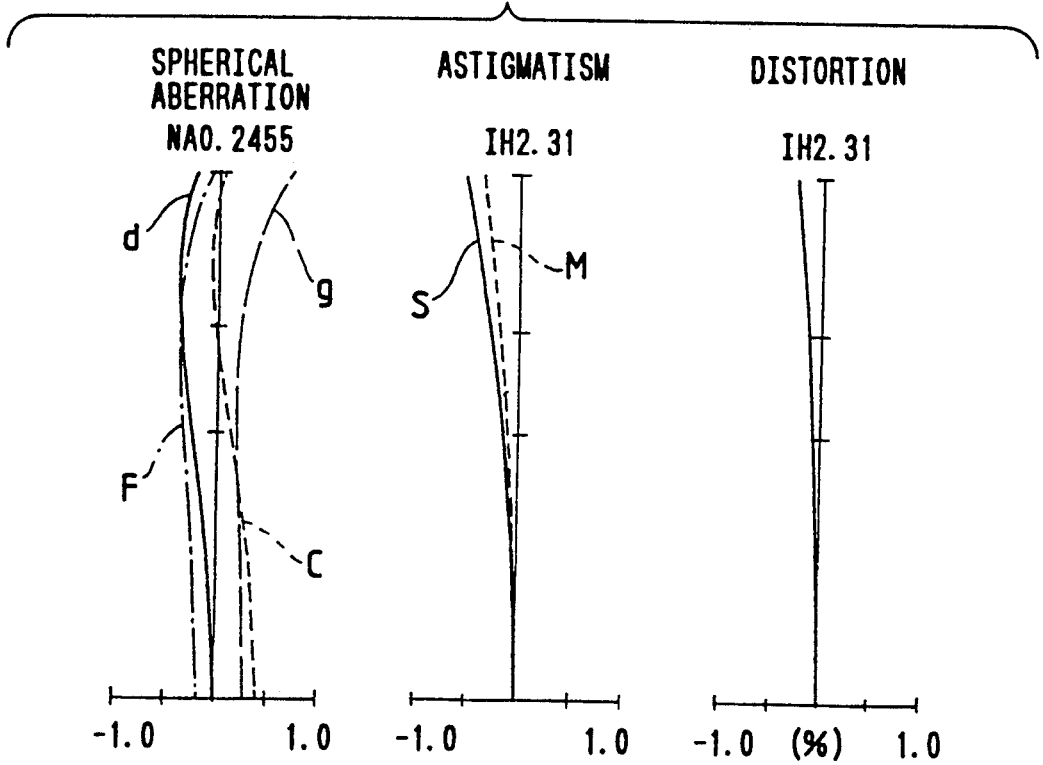

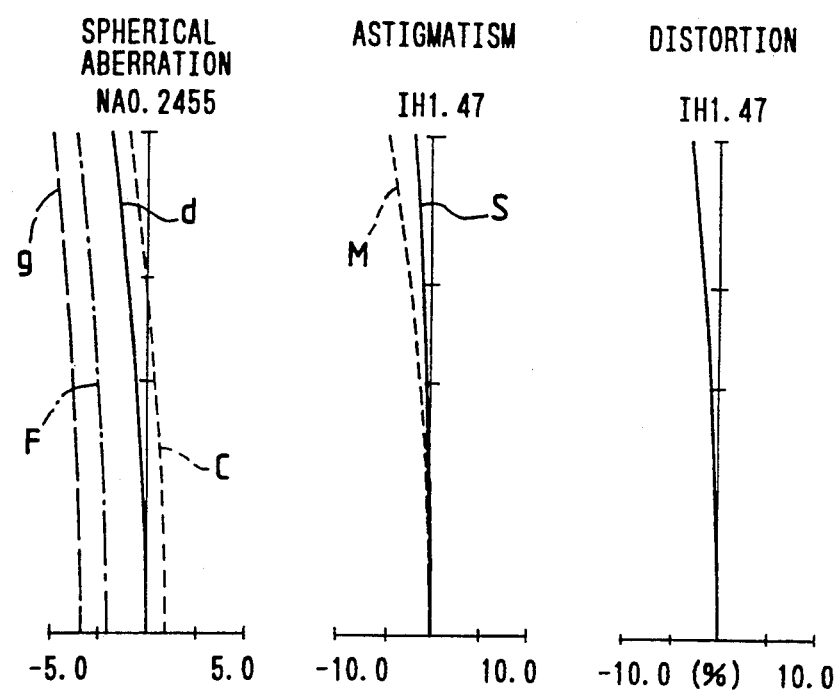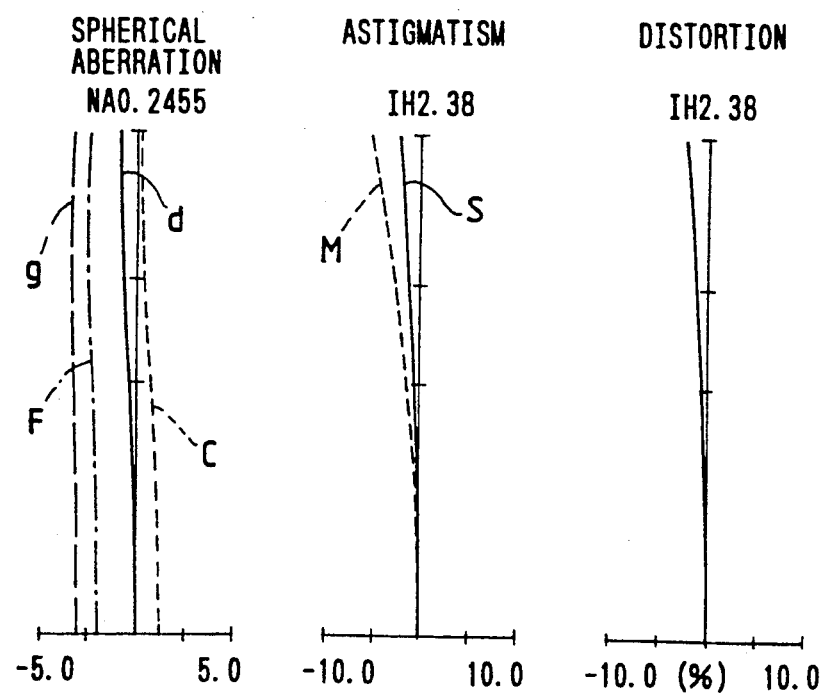

OPTICAL DEVICE FOR PHOTOGRAPHING IMAGES FORMED FROM OPTICAL FIBER BUNDLES

BACKGROUND OF THE INVENTION a) Field of the invention

The present invention relates to an imaging optical system for endoscopes, and more specifically to an imaging optical system suited for use with imaging systems which can be connected to image guide fiber bundles used for fiber catheters.

b) Description of the prior art

FIG. 1 shows a configuration of an imaging system which is used for observing interiors of body cavities, machines, etc. on a monitor TV. In this drawing, the reference numeral 1 represents a fiber scope which accommodates an observation optical system consisting of an objective lens 2, an image guide fiber bundle 3, an eyepiece lens 4, etc., and an illumination system consisting of a light source 5, a light guide fiber bundle 6, etc., and is adapted to permit observation of an object O through the observation optical system while illuminating the object with the illumination system. When an image of the object formed by the observation optical system and projected onto a monitor TV is to be observed, an adapter lens 7 is arranged after the eyepiece lens 4 and a TV camera 9 having a built-in image pickup device is arranged thereafter so that an image formed on the end surface of emergence of the image guide fiber bundle is projected onto the image pickup device 8 through the eyepiece lens 4 and the adapter lens 7. Output signals provided from the image pickup device 8 are fed into a camera control unit 10 comprising a signal processing circuit for performing predetermined signal processing and then inputting the signals into a monitor TV 11.

The imaging system of the above-described type, in which an image of an object formed by a fiber scope is projected onto a monitor TV by using the adapter lens, has a defect that it allows size of the image to be variable on the monitor TV depending on the types of fiber scopes employed. The fiber scopes are equipped with image guide fiber bundles different in thickness thereof and eyepiece lenses having different magnifications.

In order to correct this defect, it is desired in these days to use a zoom lens system as the adapter lens. For example, there is known the imaging system disclosed by Japanese Patent Kokai Publication No. Sho 62-285454 which uses, as an adapter lens, a zoom lens system capable of providing optimum magnifications and image brightness even when combined with various types of fiber scopes, non-flexible endoscopes and so on.

FIG. 2 shows a sectional view illustrating a conventional example a of zoom lens system to be used as an adapter lens. This zoom lens system consists, in the order from the side of the eyepiece lens, a first lens unit $L_1$ functioning as a compensator, a second lens unit $L_2$ functioning as a variator and a third lens unit having an imaging function.

Further, as another example of zoom lens system which is used as an eyepiece lens for endoscopes, there is known the lens system disclosed by Japanese Patent Kokai Publication No. Sho 58-66911 which consists of a positive lens unit and a negative lens unit.

In the field of endoscopes, attention is now concentrated on the fiber scope which is designed for observation of blood vessels. This fiber scope is very thin, or equipped with a distal end having an outside diameter of approximately 1 mm, and is used for observing not only blood vessels but also pancreatic ducts and so on.

The image guide fiber bundle which is designed for use with such a fiber scope has a very small outside diameter on the order of several-tenths of a millimeter. Accordingly, the end surface of the image guide fiber bundle narrows the apparent visual field and makes observation rather inconvenient when observation is through an eyepiece lens in he conventional manner. Further, also when an adapter lens is attached to the eyepiece lens for imaging, the image guide fiber bundle poses a problem that the conventional zoom type adapter lens system has too low a magnification for satisfactory observation.

SUMMARY OF THE INVENTION

A primary object of the present invention is to provide an imaging optical system which is capable of varying magnification thereof so as to permit forming images of sufficient sizes even when the optical system is combined with a very thin image guide fiber bundle.

FIG. 3 shows a sectional view schematically illustrating a configuration of an imaging system using the imaging optical system according to the present invention. In this drawing, the reference numeral 1 represents a fiber scope which comprises an objective lens 2, an image guide fiber bundle 3 and a light guide fiber bundle 6. This fiber scope is not equipped with an eyepiece lens, and the image guide fiber bundle 3 can be connected and disconnected directly to and from a camera control unit 10. The camera control unit 10 (hereinafter abbreviated as CCU) comprises the imaging optical system and an image pickup device 8 so that an image of the end surface of emergence of the image guide fiber bundle 3 is projected, when it is connected to the CCU 10, by the imaging optical system onto the image pickup device 8. The reference numeral 12 designates a signal processing circuit for receiving output signals from the image pickup device 8.

In the description that follows, the distance as measured from the object point to the image point of the image pickup system is normalized to 100.

The imaging optical system mentioned above is that according to the present invention. This imaging optical system comprises, in the order from the side of incidence of rays, a first lens unit I having a positive refractive power, a second lens unit II which functions as a compensator and has a positive refractive power, a third lens unit III which functions as a variator and has a negative refractive power, and a fourth positive lens unit IV having an imaging function. The imaging optical system is designed so as to satisfy the following condition (1):

$$\beta_{12} < = 2 \qquad (1)$$

wherein the reference symbol $\beta_{12}$ represents the total imaging magnification of the first lens unit and the second lens unit.

FIG. 4 shows a diagram visualizing the power distribution selected for the imaging optical system according to the present invention. When the total imaging magnification of the first and second lens units I and II is represented by $\beta_{12}$, the magnification of the third lens unit III is designated by $\beta_3$, and the magnification of the fourth lens unit is denoted by $\beta_4$, the imaging optical system as a whole has a magnification which is given by the following formula (i):

$$\beta = \beta_{12} \cdot \beta_3 \cdot \beta_4 \qquad (i)$$

On the basis of this formula, let us examine the condition required for enhancing the magnification $\beta$ of the imaging optical system as a whole while considering the dimensions thereof and the aberrations therein.

FIG. 5 shows a diagram illustrating the relationship between an object point and an image point, etc. of a lens L. In this drawing, the distance as measured from an object O to an image I thereof is expressed by the following formula (ii):

$$IO = l + l' = f_L \left( 2 + |\beta_L| + \frac{1}{|\beta_L|} \right) \qquad (ii)$$

wherein the reference symbol $f_L$ represents the focal length of the lens L and the reference symbol $\beta_L$ designates the magnification of the lens L.

As is judged from the formula (ii), $\beta_L$ must be $\pm 1$ to minimize the absolute value of the distance IO. By applying this fact to the third lens unit III, it is possible to design the imaging optical system compact.

When the third lens unit III is designed so as to have the magnification $\beta_3$ of $-1$ at an intermediate focal length within the zooming range of the imaging optical system, the magnification $\beta$ of the optical system as a whole has an absolute value $|\beta| = \beta_{12} \cdot \beta_4$ at that intermediate focal length. When variations of heights of rays to be caused by moving the third lens unit adopted as the variator is compared between the first lens unit or the second lens unit and the fourth lens unit, variation of height of ray is more remarkably in the fourth lens unit. In order to suppress the variation of the height of ray in the fourth lens unit, it is desirable to select a nearly symmetrical lens arrangement for the fourth lens unit IV, or to compose the fourth lens unit nearly so as to be aplanatic with regard to the image point of the third lens unit III, i.e., the object point for the fourth lens unit IV, and the image point of the fourth lens unit. For this purpose, it is desirable to select a value in the vicinity of $-1$ for the magnification $\beta_4$ of the fourth lens unit IV.

For the reason described above, it is necessary to enhance the magnification $\beta$ of the imaging optical system as a whole by selecting $\beta_{12}$ so as to be larger than a certain definite value. The condition (1) has been adopted for this purpose. If the condition (1) is not satisfied, it will be impossible to design the imaging optical system so as to have high magnification.

Further, it is desirable to design the imaging optical system according to the present invention so as to satisfy the conditions (2), (3), (4) and (5) listed below:

$$|f_3| < 20 \qquad (2)$$

$$-6 < \beta_3 < -0.4 \qquad (3)$$

$$8 < f_4 < 40 \qquad (4)$$

$$-5 < \beta_4 < -0.5 \qquad (5)$$

wherein the reference symbols $f_3$ and $f_4$ represents the focal lengths of the third lens unit III and the fourth lens unit IV respectively, and the reference symbols $\beta_3$ and $\beta_4$ designates the magnifications of the third lens unit LI and the fourth lens unit IV respectively.

The condition (2) is required for shortening the distance IO as measured from the object point to the image point of the third lens unit III.

By applying the above-mentioned formula (ii) to the third lens unit III, we obtain the following relationship:

$$IO = f_3 \left( 2 + |\beta_3| + \frac{1}{|\beta_3|} \right) \geq 4f_3 \qquad (iii)$$

$f_3(2 + |\beta_3| + 1/|\beta_3|)$ is equal to $4f_3$ when $\beta_3$ has a value of $\pm 1$.

On the basis of the relationship mentioned above, it is necessary for the third lens unit to satisfy the condition (2). If the condition (2) is not satisfied, the imaging optical system has a long total length.

The condition (3) is required also for designing the imaging optical system compact.

FIG. 6 visualizes the relationship expressed by the formula (iii) taking $\beta_3$ and $IO/f_3$ as the abscissa and the ordinate respectively. The distance IO is the minimum and the third lens unit is to be moved for a short distance when magnifications of this lens unit is set as follows on both the sides of $-1$:

$$\beta_{3W} = -1/\sqrt{z} \text{ and } \beta_{3T} = -\sqrt{z}$$

wherein the reference symbol z represents the zooming ratio of the imaging optical system, and the reference symbols $\beta_{3W}$ and $\beta_{3T}$ designate the magnifications of the third lens unit at the wide position and the tele position respectively. It is therefore necessary to design the third lens unit so as to satisfy the condition (3).

Further, the moving distance $\Delta$ of the third lens unit is expressed as follows:

$$\Delta = f_3 \left( \frac{1}{\beta_{3W}} - \frac{1}{\beta_{3T}} \right)$$

The condition (3) is required also for reducing the value of $\Delta$ or shortening the moving distance of the third lens unit.

The conditions (4) and (5) define back focal length S' of the imaging optical system.

The back focal length S' of the imaging optical system is given by the following formula:

$$S' = f_4(1 - \beta_4)$$

If $f_4$ is shorter than the lower limit of the condition (4) or $\beta_4$ exceeds the upper limit of the condition (5), the fourth lens unit will have a strengthened power, thereby remarkably undercorrecting the upper longitudinal coma at the wide position. So far as $f_4$ is shorter than the upper limit of the condition (4) and $\beta_4$ is higher than the lower limit of the condition (5), it is possible to reserve a space for arranging an optical low pass filter made of quartz or the similar substance, an infrared cut filter and YAG laser light cut filter and so on before the solid-state image pickup device. If the lower limit of the condition (4) or the upper optical system will have too long a back focal length. If the upper limit of the condition (4) or the lower limit of the condition (5) is exceeded, the imaging optical system will have too short a back focal length.

Furthermore, it is desirable to design the imaging optical system according to the present invention so as to satisfy the conditions (6) and (7) listed below:

$$|\epsilon|<15° \quad (6)$$

$$|\beta'|<15° \quad (7)$$

wherein the reference symbol $\epsilon$ represents the inclination angle of the principal ray emitted from the maximum height of object and the reference symbol $\epsilon'$ designates the inclination angle of the principal ray incident on the maximum image height.

The condition (6) has been adopted for preventing the amount of light being too small at the marginal portion of the image guide by limiting the inclination angle of the principal ray coming from the maximum object height. If the condition (6) is not satisfied, it will be impossible to reserve a sufficient light amount.

The condition (7) limits the inclination angle of the principal ray incident on the maximum image height on the image side. If the condition (7) is not satisfied, color shading will be produced.

Further, the condition (6) means that the entrance pupil is located at a nearly infinite distance, whereas the condition (7) means that the exit pupil is located at a nearly infinite distance. When the passage of the principal ray is taken into consideration, it is impossible to arrange the aperture stop before the first lens unit or after the fourth lens unit. Further, it is inadequate to arrange the aperture stop before or after the third lens unit since it is used as the variator before and after which the height of ray varies. It is therefore most proper to locate the aperture stop between the first lens unit and the second lens unit.

Since the first lens unit has the strong power for enhancing the magnification $\beta_{12}$ as already described, this lens unit is apt to produce aberrations. Considering the fact that the second lens unit and the third lens unit are used as the compensator and the variator respectively, it is desirable to correct aberrations independently in the first lens unit and the second through fourth lens units. For this reason also, it is desirable to arrange the aperture stop between the first lens unit and the second lens unit.

Next, in order to prevent aberrations from being varied by moving the first lens unit for focusing or moving the second lens unit as the variator, it is preferable to design the imaging optical system according to the present invention so as to satisfy the following condition (8):

$$|\theta|<10° \quad (8)$$

wherein the reference symbol $\theta$ represents the inclination angle of the marginal ray relative to the optical axis.

If the condition (8) is not satisfied, aberrations will be varied undesirably due to the variation of the airspace between the first lens unit and the second lens unit which is caused by moving the first lens unit and the second lens unit as described above.

Furthermore, it is desirable to use, as a means for correcting aberrations in a zoom lens system, at least one cemented lens component in each of the lens units so as to correct chromatic aberration independently in each of the lens units. Moreover, the imaging optical system according to the present invention has a large numerical aperture for the light bundle to be incident from the image guide for enhancing $\beta_{12}$ as already described above. Accordingly, the imaging optical system according to the present invention cannot be brought into focus properly unless the distance between the end surface of the image guide and the imaging optical system is adjustable to a constant value after the image guide is reconnected or replaced with another. For this reason, the first lens unit is designed so as to be slightly movable along the optical axis for allowing adjustment to locate the end surface of emergence of the image guide at the front focal point of the first lens unit despite variations of the location of the end surface of emergence of the image guide. When the end surface of emergence of the light guide is located at the front focal point of the first lens unit, the focal point of the imaging optical system is not shifted even when the airspaces between the lens units are slightly varied due to manufacturing error and assembling error of the cam rings which are used for driving the compensator and the variator arranged as the second and later lens units.

In addition, it is possible to design the first lens unit so as to be separable from the second through fourth lens units so that the first lens unit is removable for replacement with other lens units. Such a design of the first lens unit will make it possible to selectively use first lens units most suited for use with fiber scopes having different specifications which are to be combined with the imaging optical system according to the present invention.

BRIEF DESCRIPTION OF THE DRAWINGS

FIG. 1 shows a sectional view illustrating the configuration of the conventional imaging system comprising an endoscope, an image pickup device and so on;

FIG. 15 through FIG. 17 show graphs illustrating aberration characteristics of the Embodiment 1 of the present invention;

FIG. 33 through FIG. 35 show graphs visualizing aberration characteristics of the Embodiment 7 of the present invention.

DETAILED DESCRIPTION OF THE PREFERRED EMBODIMENTS

Figure 1:
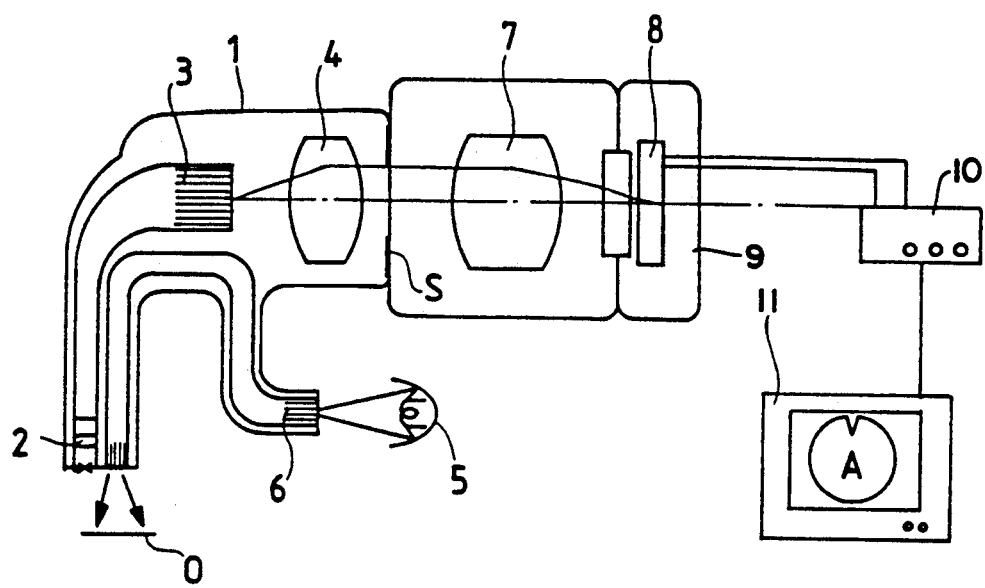
Figure 2:
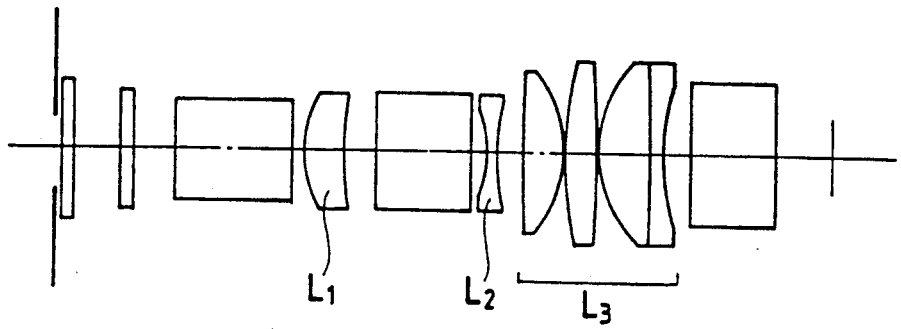
FIG. 2 shows a sectional view illustrating the composition of the conventional imaging optical system.
Figure 3:
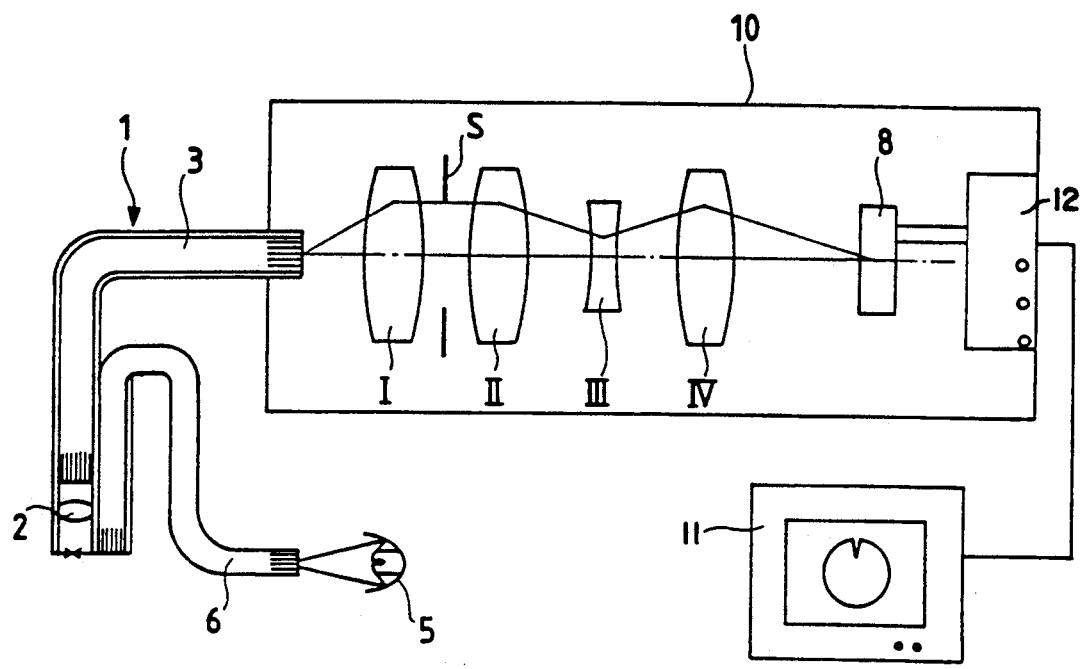
FIG. 3 shows a sectional view illustrating configuration of an imaging system equipped with the imaging optical system according to the present invention.

Now, the imaging optical system according to the present invention will be described more detailedly below with reference to the preferred embodiments shown in the accompanying drawings and given in the form of the following numerical data:

Embodiment 1

$f = -112.213 \sim 3.825$,
image height $1.4331 \sim 3.2929$
object point $0.37103$ $r_1 = \infty$
$d_1 = 0.3710$    $n_1 = 1.51633$    $\nu_1 = 64.15$
$r_2 = \infty$
$d_2 = 0.6957$
$r_3 = \infty$
$d_3 = 0.5566$    $n_2 = 1.51633$    $\nu_2 = 64.15$
$r_4 = \infty$
$d_4 = 0.0557$
$r_5 = -56.3034$
$d_5 = 0.9276$    $n_3 = 1.51823$    $\nu_2 = 58.96$
$r_6 = -3.061$
$d_6 = 0.2876$
$r_7 = 5.2891$
$d_7 = 1.0203$    $n_4 = 1.6223$    $\nu_4 = 53.2$
$r_8 = -5.2891$
$d_8 = 0.5102$
$r_9 = -6.6981$
$d_9 = 0.8255$    $n_5 = 1.74$    $\nu_5 = 28.29$
$r_{10} = 2.2299$
$d_{10} = 1.6882$    $n_6 = 1.53256$    $\nu_6 = 45.91$
$r_{11} = -8.9094$
$d_{11} = 2.1984$
$r_{12} = -17.3922$
$d_{12} = 1.3728$    $n_7 = 1.53256$    $\nu_7 = 45.91$
$r_{13} = -5.1963$
$d_{13} = 0.4545$
$r_{14} = \infty$ (aperture stop)
$d_{14} = D_1$ (variable)
$r_{15} = 15.0751$
$d_{15} = 3.6083$    $n_8 = 1.51633$    $\nu_8 = 64.15$
$r_{16} = -15.0751$
$d_{16} = 1.8552$    $n_9 = 1.5927$    $\nu_9 = 35.29$
$r_{17} = \infty$
$d_{17} = D_2$ (variable)
$r_{18} = -50.4188$
$d_{18} = 0.9276$    $n_{10} = 1.6968$    $\nu_{10} = 55.52$
$r_{19} = 3.8383$
$d_{19} = 1.3914$    $n_{11} = 1.834$    $\nu_{11} = 37.16$
$r_{20} = 7.1823$
$d_{20} = D_3$ (variable)
$r_{21} = 18.8448$
$d_{21} = 2.7828$    $n_{12} = 1.696$    $\nu_{12} = 55.52$
$r_{22} = -7.5607$
$d_{22} = 0.9276$    $n_{13} = 1.834$    $\nu_{13} = 37.16$
$r_{23} = -25.0522$
$d_{23} = 17.8838$
$r_{24} = \infty$ (flare stop)
$d_{24} = 1.8552$
$r_{25} = \infty$
$d_{25} = 20.3141$    $n_{14} = 1.54869$    $\nu_{14} = 45.55$
$r_{26} = \infty$
$d_{26} = 0.0928$ $r_{27} = \infty$
$d_{27} = 0.9276$    $n_{15} = 1.52287$    $\nu_{15} = 59.9$
$r_{28} = \infty$
$d_{28} = 5.4727$
$r_{29} = \infty$
$d_{29} = 1.3914$    $n_{16} = 1.51633$    $\nu_{16} = 64.15$
$r_{30} = \infty$
$d_{30} = 10.1014$
$r_{31} = \infty$
$d_{31} = 0.371$    $n_{17} = 1.51633$    $\nu_{17} = 64.15$
$r_{32} = \infty$

| f | $-112.213$ | $12.534$ | $3.825$ |
|---|---|---|---|
| $D_1$ | 2.998 | 0.543 | 3.061 |
| $D_2$ | 1.653 | 8.186 | 12.259 |
| $D_3$ | 13.171 | 9.094 | 2.503 |

$\beta_{12}(W) = -7.3915$,    $\beta_{12}(S) = -7.4113$
$\beta_{12}(T) = -7.3910$
$\beta_3(W) = -0.6239$,    $\beta_3(S) = -1.00185$
$\beta_3(T) = -1.6138$
$\beta_4 = -1.67677$,    $f_3 = -10.77$,    $f_4 = 19.66$
$\epsilon = 1.736° \sim 1.542°$,    $\epsilon' = -0.113° \sim 2.56°$
$\theta = 0.06°$

Embodiment 2

$f = 45.54 \sim 2.829$,
image height $1.6399 \sim 3.768$
object point $0.42162$ $r_1 = \infty$
$d_1 = 1.0614$    $n_1 = 1.51633$    $\nu_1 = 64.15$
$r_2 = \infty$
$d_2 = 2.6111$
$r_3 = -5.0693$
$d_3 = 0.5625$    $n_2 = 1.78472$    $\nu_2 = 25.71$
$r_4 = 9.3861$
$d_4 = 2.1653$    $n_3 = 1.53113$    $\nu_3 = 62.44$
$r_5 = -4.165$
$d_5 = 0.1698$
$r_6 = 246.5711$
$d_6 = 1.0826$    $n_4 = 1.713$    $\nu_4 = 53.84$
$r_7 = -9.5548$
$d_7 = 0.1592$
$r_8 = 5.3283$
$d_8 = 1.4117$    $n_5 = 1.713$    $\nu_5 = 53.84$
$r_9 = 8.3384$
$d_9 = 0.1061$
$r_{10} = 3.8773$
$d_{10} = 1.3692$    $n_6 = 1.713$    $\nu_6 = 53.84$
$r_{11} = 10.5833$
$d_{11} = 0.5944$    $n_7 = 1.5927$    $\nu_7 = 35.29$
$r_{12} = 2.3585$
$d_{12} = 3.4177$
$r_{13} = \infty$ (aperture stop)
$d_{13} = D_1$ (variable)
$r_{14} = 15.4576$
$d_{14} = 3.1264$    $n_8 = 1.48749$    $\nu_8 = 70.2$
$r_{15} = -18.3761$
$d_{15} = 2.1018$    $n_9 = 1.5927$    $\nu_9 = 35.29$
$r_{16} = \infty$
$d_{16} = D_2$ (variable)
$r_{17} = 171.6296$
$d_{17} = 2.1228$    $n_{10} = 1.834$    $\nu_{10} = 37.16$
$r_{18} = -6.2371$
$d_{18} = 1.0614$    $n_{11} = 1.6968$    $\nu_{11} = 55.52$
$r_{19} = 9.2109$
$d_{19} = 1.2737$
$r_{20} = -5.0772$
$d_{20} = 1.2206$    $n_{12} = 1.6968$    $\nu_{12} = 55.52$
$r_{21} = -8.7247$
$d_{21} = D_3$ (variable)
$r_{22} = 50.5648$
$d_{22} = 1.5585$    $n_{13} = 1.6968$    $\nu_{13} = 55.52$
$r_{23} = -16.9216$
$d_{23} = 0.2123$
$r_{24} = 14.8884$
$d_{24} = 3.5324$    $n_{14} = 1.6968$    $\nu_{14} = 55.52$
$r_{25} = -11.1969$
$d_{25} = 3.738$    $n_{15} = 1.834$    $\nu_{15} = 37.16$
$r_{26} = 16.0921$ -continued

| | | | |
|---|---|---|---|
| $d_{26} = 5.2997$ | | | |
| $r_{27} = \infty$ | | | |
| $d_{27} = 17.5027$ | | $n_{16} = 1.54869$ | $\nu_{16} = 45.55$ |
| $r_{28} = \infty$ | | | |
| $d_{28} = 0.1061$ | | | |
| $r_{29} = \infty$ | | | |
| $d_{29} = 1.0614$ | | $n_{17} = 1.52287$ | $\nu_{17} = 59.9$ |
| $r_{30} = \infty$ | | | |
| $d_{30} = 0.1061$ | | | |
| $r_{31} = \infty$ | | | |
| $d_{31} = 1.5921$ | | $n_{18} = 1.51633$ | $\nu_{18} = 64.15$ |
| $r_{32} = \infty$ | | | |
| f | 45.54 | 6.953 | 2.829 |
| $D_1$ | 3.348 | 0.53 | 2.566 |
| $D_2$ | 5.719 | 12.703 | 16.438 |
| $D_3$ | 11.077 | 6.912 | 1.14 |

$\beta_{12}(W) = -7.6048$, $\beta_{12}(S) = -7.6258$
$\beta_{12}(T) = -7.6106$
$\beta_3(W) = -0.5987$, $\beta_3(S) = -0.9969$
$\beta_3(T) = -1.5487$
$\beta_4 = -1.6968$, $f_3 = -10.459$, $f_4 = 16.526$
$\epsilon = 0.021° \sim 0.025°$, $\epsilon' = -0.262° \sim 3.815°$
$\theta = 0.06°$

Embodiment 3

$f = -389.004 \sim 2.89$,
image height $1.6752 \sim 3.2529$
object point $0.66554$

| | | | |
|---|---|---|---|
| $r_1 = \infty$ | | | |
| $d_1 = 0.4337$ | | $n_1 = 1.51633$ | $\nu_1 = 64.15$ |
| $r_2 = \infty$ | | | |
| $d_2 = 0.3253$ | | | |
| $r_3 = \infty$ | | | |
| $d_3 = 0.6506$ | | $n_2 = 1.54869$ | $\nu_2 = 45.55$ |
| $r_4 = \infty$ | | | |
| $d_4 = 0.3253$ | | | |
| $r_5 = -65.8156$ | | | |
| $d_5 = 1.0843$ | | $n_3 = 1.51823$ | $\nu_3 = 58.96$ |
| $r_6 = -3.5782$ | | | |
| $d_6 = 0.3361$ | | | |
| $r_7 = 6.1827$ | | | |
| $d_7 = 1.1927$ | | $n_4 = 1.6223$ | $\nu_4 = 53.2$ |
| $r_8 = -6.1827$ | | | |
| $d_8 = 0.5964$ | | | |
| $r_9 = -7.8297$ | | | |
| $d_9 = 0.965$ | | $n_5 = 1.74$ | $\nu_5 = 28.29$ |
| $r_{10} = 2.612$ | | | |
| $d_{10} = 1.9734$ | | $n_6 = 1.53256$ | $\nu_6 = 45.91$ |
| $r_{11} = -10.4147$ | | | |
| $d_{11} = 2.5698$ | | | |
| $r_{12} = -20.3988$ | | | |
| $d_{12} = 1.6048$ | | $n_7 = 1.53256$ | $\nu_7 = 45.91$ |
| $r_{13} = -6.0742$ | | | |
| $d_{13} = 0.5313$ | | | |
| $r_{14} = \infty$ (aperture stop) | | | |
| $d_{14} = D_1$ (variable) | | | |
| $r_{15} = 15.9464$ | | | |
| $d_{15} = 3.2504$ | | $n_8 = 1.51633$ | $\nu_8 = 64.15$ |
| $r_{16} = -15.4875$ | | | |
| $d_{16} = 2.085$ | | $n_9 = 1.5927$ | $\nu_9 = 35.29$ |
| $r_{17} = \infty$ | | | |
| $d_{17} = D_2$ (variable) | | | |
| $r_{18} = -10.5871$ | | | |
| $d_{18} = 2.1686$ | | $n_{10} = 1.834$ | $\nu_{10} = 37.16$ |
| $r_{19} = -4.4433$ | | | |
| $d_{19} = 1.0843$ | | $n_{11} = 1.6968$ | $\nu_{11} = 55.52$ |
| $r_{20} = 12.5152$ | | | |
| $d_{20} = D_3$ (variable) | | | |
| $r_{21} = 37.2411$ | | | |
| $d_{21} = 2.1686$ | | $n_{12} = 1.6968$ | $\nu_{12} = 55.52$ |
| $r_{22} = -20.5354$ | | | |
| $d_{22} = 0.2169$ | | | |
| $r_{23} = 12.7862$ | | | |
| $d_{23} = 3.6463$ | | $n_{13} = 1.6968$ | $\nu_{13} = 55.52$ |
| $r_{24} = -12.8368$ | | | |
| $d_{24} = 3.9289$ | | $n_{14} = 1.834$ | $\nu_{14} = 37.16$ |
| $r_{25} = 13.1533$ | | | |
| $d_{25} = 4.013$ | | | |

-continued

| | | | |
|---|---|---|---|
| $r_{26} = \infty$ | | | |
| $d_{26} = 17.88$ | | $n_{15} = 1.54869$ | $\nu_{15} = 45.55$ |
| $r_{27} = \infty$ | | | |
| $d_{27} = 0.1084$ | | | |
| $r_{28} = \infty$ | | | |
| $d_{28} = 1.0843$ | | $n_{16} = 1.52287$ | $\nu_{16} = 59.9$ |
| $r_{29} = \infty$ | | | |
| $d_{29} = 0.1084$ | | | |
| $r_{30} = \infty$ | | | |
| $d_{30} = 1.6264$ | | $n_{17} = 1.51633$ | $\nu_{17} = 64.15$ |
| $r_{31} = \infty$ | | | |
| f | $-389.004$ | 9.032 | 2.89 |
| $D_1$ | 2.388 | 0.53 | 2.991 |
| $D_2$ | 9.024 | 14.326 | 17.921 |
| $D_3$ | 12.444 | 9.001 | 2.945 |

$\beta_{12}(W) = -6.725$, $\beta_{12}(S) = -6.737$
$\beta_{12}(T) = -6.721$
$\beta_3(W) = -0.6420$, $\beta_3(S) = -1.0121$
$\beta_3(T) = -1.6630$
$\beta_4 = -1.7894$, $f_3 = -9.3037$, $f_4 = 15.9608$
$\epsilon = 1.685° \sim 2.183°$, $\epsilon' = 0.17° \sim -4.296°$
$\theta = 0.06°$

Embodiment 4

$f = 93.59 \sim 3.036$,
image height $1.4236 \sim 3.271$
object point $0.2764$

| | | | |
|---|---|---|---|
| $r_1 = \infty$ | | | |
| $d_1 = 0.4607$ | | $n_1 = 1.51633$ | $\nu_1 = 64.15$ |
| $r_2 = \infty$ | | | |
| $d_2 = 0.7259$ | | | |
| $r_3 = \infty$ | | | |
| $d_3 = 0.3041$ | | $n_2 = 1.51633$ | $\nu_2 = 64.15$ |
| $r_4 = \infty$ | | | |
| $d_4 = 0.7488$ | | $n_3 = 1.54869$ | $\nu_3 = 45.55$ |
| $r_5 = \infty$ | | | |
| $d_5 = 0.0533$ | | | |
| $r_6 = -55.9283$ | | | |
| $d_6 = 0.9214$ | | $n_4 = 1.51823$ | $\nu_4 = 58.96$ |
| $r_7 = -3.0406$ | | | |
| $d_7 = 0.2856$ | | | |
| $r_8 = 5.2538$ | | | |
| $d_8 = 1.0135$ | | $n_5 = 1.6223$ | $\nu_5 = 53.20$ |
| $r_9 = -5.2538$ | | | |
| $d_9 = 0.5068$ | | | |
| $r_{10} = -6.6535$ | | | |
| $d_{10} = 0.82$ | | $n_5 = 1.74$ | $\nu_6 = 28.29$ |
| $r_{11} = 2.2151$ | | | |
| $d_{11} = 1.677$ | | $n_7 = 1.53256$ | $\nu_7 = 45.91$ |
| $r_{12} = -8.8501$ | | | |
| $d_{12} = 2.1837$ | | | |
| $r_{13} = -17.2763$ | | | |
| $d_{13} = 1.3637$ | | $n_8 = 1.53256$ | $\nu_8 = 45.91$ |
| $r_{14} = -5.1617$ | | | |
| $d_{14} = 0.4515$ | | | |
| $r_{15} = \infty$ (aperture stop) | | | |
| $d_{15} = D_1$ (variable) | | | |
| $r_{16} = 14.9747$ | | | |
| $d_{16} = 3.5843$ | | $n_9 = 1.51633$ | $\nu_9 = 64.15$ |
| $r_{17} = -14.9747$ | | | |
| $d_{17} = 1.8428$ | | $n_{10} = 1.5927$ | $\nu_{10} = 35.29$ |
| $r_{18} = \infty$ | | | |
| $d_{18} = D_2$ (variable) | | | |
| $r_{19} = -50.0829$ | | | |
| $d_{19} = 0.9214$ | | $n_{11} = 1.6968$ | $\nu_{11} = 55.52$ |
| $r_{20} = 3.8128$ | | | |
| $d_{20} = 1.3821$ | | $n_{12} = 1.834$ | $\nu_{12} = 37.16$ |
| $r_{21} = 7.1344$ | | | |
| $d_{21} = D_3$ (variable) | | | |
| $r_{22} = 11.9433$ | | | |
| $d_{22} = 2.7706$ | | $n_{13} = 1.6968$ | $\nu_{13} = 55.52$ |
| $r_{23} = 16.625$ | | | |
| $d_{23} = 1.8365$ | | $n_{14} = 1.834$ | $\nu_{14} = 37.16$ |
| $r_{24} = 52.1671$ | | | |
| $d_{24} = 16.1430$ | | | |
| $r_{25} = \infty$ (flare stop) | | | |
| $d_{25} = 1.3821$ | | | |
| $r_{26} = \infty$ | | | |

-continued

| | | |
|---|---|---|
| $d_{26} = 21.9755$ | $n_{15} = 1.54869$ | $\nu_{15} = 45.55$ |
| $r_{27} = \infty$ | | |
| $d_{27} = 0.0921$ | | |
| $r_{28} = \infty$ | | |
| $d_{28} = 0.9214$ | $n_{16} = 1.52287$ | $\nu_{16} = 59.90$ |
| $r_{29} = \infty$ | | |
| $d_{29} = 5.4363$ | | |
| $r_{30} = \infty$ | | |
| $d_{30} = 1.3821$ | $n_{17} = 1.51633$ | $\nu_{17} = 64.15$ |
| $r_{31} = \infty$ | | |
| $d_{31} = 10.0341$ | | |
| $r_{32} = \infty$ | | |
| $d_{32} = 0.3686$ | $n_{18} = 1.51633$ | $\nu_{18} = 64.15$ |
| $r_{33} = \infty$ | | |

| | | | |
|---|---|---|---|
| f | 93.59 | 9.39 | 3.362 |
| $D_1$ | 2.975 | 0.535 | 3.036 |
| $D_2$ | 1.641 | 8.131 | 12.177 |
| $D_3$ | 13.084 | 9.034 | 2.486 |

$\beta_{12}(W) = -7.3913$, $\beta_{12}(S) = -7.4110$
$\beta_{12}(T) = -7.3908$
$\beta_3(W) = -0.62332$, $\beta_3(S) = -1.00198$
$\beta_3(T) = -1.61416$
$\beta_4 = -1.6769$, $f_3 = -10.700$, $f_4 = 19.458$
$\epsilon = 1.736° \sim 1.542°$, $\epsilon' = -0.132° \sim -2.593°$
$\theta = 0.005°$

Embodiment 5

$f = 373.237 \sim 3.459$
image height $1.4236 \sim 3.271$
object point $0.2764$

| | | |
|---|---|---|
| $r_1 = \infty$ | | |
| $d_1 = 0.4607$ | $n_1 = 1.51633$ | $\nu_1 = 64.15$ |
| $r_2 = \infty$ | | |
| $d_2 = 0.7259$ | | |
| $r_3 = \infty$ | | |
| $d_3 = 0.3041$ | $n_2 = 1.51633$ | $\nu_2 = 64.15$ |
| $r_4 = \infty$ | | |
| $d_4 = 0.2488$ | $n_3 = 1.54869$ | $\nu_3 = 45.55$ |
| $r_5 = \infty$ | | |
| $d_5 = 0.0553$ | | |
| $r_6 = -55.9283$ | | |
| $d_6 = 0.9214$ | $n_4 = 1.51823$ | $\nu_4 = 58.96$ |
| $r_7 = -3.0406$ | | |
| $d_7 = 0.2856$ | | |
| $r_8 = 5.2538$ | | |
| $d_8 = 1.0135$ | $n_5 = 1.6223$ | $\nu_5 = 53.20$ |
| $r_9 = -5.2538$ | | |
| $d_9 = 0.5068$ | | |
| $r_{10} = -6.6535$ | | |
| $d_{10} = 0.82$ | $n_6 = 1.74$ | $\nu_6 = 28.29$ |
| $r_{11} = 2.2151$ | | |
| $d_{11} = 1.677$ | $n_7 = 1.53256$ | $\nu_7 = 45.91$ |
| $r_{12} = -8.8501$ | | |
| $d_{12} = 2.1837$ | | |
| $r_{13} = -17.2763$ | | |
| $d_{13} = 1.3677$ | $n_6 = 1.53256$ | $\nu_8 = 45.91$ |
| $r_{14} = -5.1617$ | | |
| $d_{14} = 0.4515$ | | |
| $r_{15} = \infty$ (aperture stop) | | |
| $d_{15} = D_1$ (variable) | | |
| $r_{16} = 14.9747$ | | |
| $d_{16} = 3.5843$ | $n_9 = 1.51633$ | $\nu_9 = 64.15$ |
| $r_{17} = -14.9747$ | | |
| $d_{17} = 1.8428$ | $n_{10} = 1.5927$ | $\nu_{10} = 35.29$ |
| $r_{18} = \infty$ | | |
| $d_{18} = D_2$ (variable) | | |
| $r_{19} = -50.0829$ | | |
| $d_{19} = 0.9214$ | $n_{11} = 1.6968$ | $\nu_{11} = 55.52$ |
| $r_{20} = 3.8128$ | | |
| $d_{20} = 1.3821$ | $n_{12} = 1.834$ | $\nu_{12} = 37.16$ |
| $r_{21} = 7.1344$ | | |
| $d_{21} = D_3$ (variable) | | |
| $r_{22} = \infty$ (flare stop) | | |
| $d_{22} = 0.4118$ | | |
| $r_{23} = 63.2338$ | | |
| $d_{23} = 2.2492$ | $n_{13} = 1.741$ | $\nu_{13} = 52.68$ |
| $r_{24} = 12.354$ | | |
| $d_{24} = 1.6649$ | $n_{14} = 1.7495$ | $\nu_{14} = 35.27$ |

-continued

| | | |
|---|---|---|
| $r_{25} = -19.5623$ | | |
| $d_{25} = 0.6921$ | | |
| $r_{26} = 18.8702$ | | |
| $d_{26} = 1.6169$ | $n_{15} = 1.51633$ | $\nu_{15} = 64.15$ |
| $r_{27} = -64.8613$ | | |
| $d_{27} = 1.7394$ | | |
| $r_{28} = -29.2122$ | | |
| $d_{28} = 0.9505$ | $n_{16} = 1.72$ | $\nu_{16} = 50.25$ |
| $r_{29} = -18.7819$ | | |
| $d_{29} = 0.9214$ | $n_{17} = 1.7495$ | $\nu_{17} = 35.27$ |
| $r_{30} = 45.9643$ | | |
| $d_{30} = 10.504$ | | |
| $r_{31} = \infty$ (flare stop) | | |
| $d_{31} = 1.3821$ | | |
| $r_{32} = \infty$ | | |
| $d_{32} = 21.9755$ | $n_{18} = 1.54869$ | $\nu_{18} = 45.55$ |
| $r_{33} = \infty$ | | |
| $d_{33} = 0.0921$ | | |
| $r_{34} = \infty$ | | |
| $d_{34} = 0.9214$ | $n_{19} = 1.52287$ | $\nu_{19} = 59.9$ |
| $r_{35} = \infty$ | | |
| $d_{35} = 5.4363$ | | |
| $r_{36} = \infty$ | | |
| $d_{36} = 1.3821$ | $n_{20} = 1.51633$ | $\nu_{20} = 64.15$ |
| $r_{37} = \infty$ | | |
| $d_{37} = 10.0341$ | | |
| $r_{38} = \infty$ | | |
| $d_{38} = 0.3686$ | $n_{21} = 1.51633$ | $\nu_{21} = 64.15$ |
| $r_{39} = \infty$ | | |

| | | | |
|---|---|---|---|
| f | 373.237 | 10.236 | 3.459 |
| $D_1$ | 2.975 | 0.535 | 3.036 |
| $D_2$ | 1.641 | 5.131 | 12.177 |
| $D_3$ | 13.084 | 9.034 | 2.486 |

$\beta_{12}(W) = -7.3913$, $\beta_{12}(S) = -7.4110$
$\beta_{12}(T) = -7.3908$
$\beta_3(W) = -0.62332$, $\beta_3(S) = -1.00198$
$\beta_3(T) = -1.61416$
$\beta_4 = -1.5413$, $f_3 = -10.699$, $f_4 = 19.831$
$\epsilon = 1.736° \sim 1.542°$, $\epsilon' = 0.125° \sim -2.198°$
$\theta = 0.005°$

Embodiment 6

$f = -29.354 \sim 4.478$
image height $1.4236 \sim 3.271$
object point $0.2764$

| | | |
|---|---|---|
| $r_1 = \infty$ | | |
| $d_1 = 0.4607$ | $n_1 = 1.51633$ | $\nu_1 = 64.15$ |
| $r_2 = \infty$ | | |
| $d_2 = 0.7259$ | | |
| $r_3 = \infty$ | | |
| $d_3 = 0.3041$ | $n_2 = 1.51633$ | $\nu_2 = 64.15$ |
| $r_4 = \infty$ | | |
| $d_4 = 0.2488$ | $n_3 = 1.54869$ | $\nu_3 = 45.55$ |
| $r_5 = \infty$ | | |
| $d_5 = 0.0553$ | | |
| $r_6 = -55.9283$ | | |
| $d_6 = 0.9214$ | $n_4 = 1.51823$ | $\nu_4 = 58.96$ |
| $r_7 = -3.0406$ | | |
| $d_7 = 0.2856$ | | |
| $r_8 = 5.2538$ | | |
| $d_8 = 1.0135$ | $n_5 = 1.6223$ | $\nu_5 = 53.2$ |
| $r_9 = -5.2538$ | | |
| $d_9 = 0.5068$ | | |
| $r_{10} = -6.6535$ | | |
| $d_{10} = 0.82$ | $n_6 = 1.74$ | $\nu_6 = 28.29$ |
| $r_{11} = 2.2151$ | | |
| $d_{11} = 1.677$ | $n_7 = 1.53256$ | $\nu_7 = 45.91$ |
| $r_{12} = -8.8501$ | | |
| $d_{12} = 2.1837$ | | |
| $r_{13} = -17.2763$ | | |
| $d_{13} = 1.3637$ | $n_8 = 1.53256$ | $\nu_8 = 45.91$ |
| $r_{14} = -5.1617$ | | |
| $d_{14} = 0.4515$ | | |
| $r_{15} = \infty$ (aperture stop) | | |
| $d_{15} = D_1$ (variable) | | |
| $r_{16} = 14.9747$ | | |
| $d_{16} = 3.5843$ | $n_9 = 1.51633$ | $\nu_9 = 64.15$ |
| $r_{17} = -14.9747$ | | |

-continued

| | | |
|---|---|---|
| $d_{17} = 1.8428$ | $n_{10} = 1.5927$ | $\nu_{10} = 35.29$ |
| $r_{18} = \infty$ | | |
| $d_{18} = D_2$ (variable) | | |
| $r_{19} = -50.0829$ | | |
| $d_{19} = 0.9214$ | $n_{11} = 1.6968$ | $\nu_{11} = 55.52$ |
| $r_{20} = 3.8128$ | | |
| $d_{20} = 1.3821$ | $n_{12} = 1.834$ | $\nu_{12} = 37.16$ |
| $r_{21} = 7.1344$ | | |
| $d_{21} = D_3$ (variable) | | |
| $r_{22} = \infty$ | | |
| $d_{22} = 0.4118$ | | |
| $r_{23} = -54.2046$ | | |
| $d_{23} = 1.169$ | $n_{13} = 1.76182$ | $\nu_{13} = 26.55$ |
| $r_{24} = 27.3666$ | | |
| $d_{24} = 1.5864$ | $n_{14} = 1.72916$ | $\nu_{14} = 54.68$ |
| $r_{25} = -16.9711$ | | |
| $d_{25} = 0.3937$ | | |
| $r_{26} = 20.4547$ | | |
| $d_{26} = 1.4578$ | $n_{15} = 1.7$ | $\nu_{15} = 48.08$ |
| $r_{27} = 51.9027$ | | |
| $d_{27} = 15.7312$ | | |
| $r_{28} = \infty$ (aperture stop) | | |
| $d_{28} = 1.3821$ | | |
| $r_{29} = \infty$ | | |
| $d_{29} = 21.9755$ | $n_{16} = 1.54869$ | $\nu_{16} = 45.55$ |
| $r_{30} = \infty$ | | |
| $d_{30} = 0.0921$ | | |
| $r_{31} = \infty$ | | |
| $d_{31} = 0.9214$ | $n_{17} = 1.52287$ | $\nu_{17} = 59.9$ |
| $r_{32} = \infty$ | | |
| $d_{32} = 5.4363$ | | |
| $r_{33} = \infty$ | | |
| $d_{33} = 1.3821$ | $n_{18} = 1.51633$ | $\nu_{18} = 64.15$ |
| $r_{34} = \infty$ | | |
| $d_{34} = 10.0341$ | | |
| $r_{35} = \infty$ | | |
| $d_{35} = 0.3686$ | $n_{19} = 1.51633$ | $\nu_{19} = 64.15$ |
| $r_{36} = \infty$ | | |

| | | | |
|---|---|---|---|
| f | $-29.354$ | 20.759 | 4.478 |
| $D_1$ | 2.975 | 0.535 | 3.036 |
| $D_2$ | 1.641 | 8.131 | 12.177 |
| $D_3$ | 13.084 | 9.034 | 2.486 |

$\beta_{12}(W) = -7.3913$, $\beta_{12}(S) = -7.7110$
$\beta_{12}(T) = -7.3908$
$\beta_3(W) = -0.62332$, $\beta_3(S) = -1.00198$
$\beta_3(T) = -1.61416$
$\beta_4 = -1.7015$, $f_3 = -10.699$, $f_4 = 18.883$
$\epsilon = 1.736° \sim 1.542°$, $\epsilon' = -0.241° \sim -2.812°$
$\theta = 0.005°$

Embodiment 7

$f = -124.214 \sim 3.767$
image height $1.4237 \sim 3.2713$
object point $0.2764$

| | | |
|---|---|---|
| $r_1 = \infty$ | | |
| $d_1 = 0.4607$ | $n_1 = 1.51633$ | $\nu_1 = 64.15$ |
| $r_2 = \infty$ | | |
| $d_2 = 0.7259$ | | |
| $r_3 = \infty$ | | |
| $d_3 = 0.3041$ | $n_2 = 1.51633$ | $\nu_2 = 64.15$ |
| $r_4 = \infty$ | | |
| $d_4 = 0.2488$ | $n_3 = 1.54869$ | $\nu_3 = 45.55$ |
| $r_5 = \infty$ | | |
| $d_5 = 0.0553$ | | |
| $r_6 = -55.933$ | | |
| $d_6 = 0.9215$ | $n_4 = 1.51823$ | $\nu_4 = 58.96$ |
| $r_7 = -3.0409$ | | |
| $d_7 = 0.2857$ | | |
| $r_8 = 5.2543$ | | |
| $d_8 = 1.0136$ | $n_5 = 1.6223$ | $\nu_5 = 53.2$ |
| $r_9 = -5.2543$ | | |
| $d_9 = 0.5068$ | | |
| $r_{10} = -6.654$ | | |
| $d_{10} = 0.8201$ | $n_6 = 1.74$ | $\nu_6 = 28.29$ |
| $r_{11} = 2.2152$ | | |
| $d_{11} = 1.6771$ | $n_7 = 1.53256$ | $\nu_7 = 45.91$ |
| $r_{12} = -8.8508$ | | |
| $d_{12} = 2.1839$ | | |

-continued

| | | |
|---|---|---|
| $r_{13} = -17.2778$ | | |
| $d_{13} = 1.3638$ | $n_8 = 1.53256$ | $\nu_8 = 45.91$ |
| $r_{14} = -5.1621$ | | |
| $d_{14} = 0.4515$ | | |
| $r_{15} = \infty$ (aperture stop) | | |
| $d_{15} = D_1$ (variable) | | |
| $r_{16} = 14.9759$ | | |
| $d_{16} = 3.5846$ | $n_9 = 1.51633$ | $\nu_9 = 64.15$ |
| $r_{17} = -14.9759$ | | |
| $d_{17} = 1.843$ | $n_{10} = 1.5927$ | $\nu_{10} = 35.29$ |
| $r_{18} = \infty$ | | |
| $d_{18} = D_2$ (variable) | | |
| $r_{19} = -50.0871$ | | |
| $d_{19} = 0.9215$ | $n_{11} = 1.6968$ | $\nu_{11} = 55.52$ |
| $r_{20} = 3.8131$ | | |
| $d_{20} = 1.3822$ | $n_{12} = 1.834$ | $\nu_{12} = 37.16$ |
| $r_{21} = 7.135$ | | |
| $d_{21} = D_3$ (variable) | | |
| $r_{22} = \infty$ | | |
| $d_{22} = 0.4118$ | | |
| $r_{23} = 75.3209$ | | |
| $d_{23} = 1.3822$ | $n_{13} = 1.50137$ | $\nu_{13} = 56.4$ |
| $r_{24} = -14.8764$ | | |
| $d_{24} = 0.2764$ | | |
| $r_{25} = 26.5985$ | | |
| $d_{25} = 2.3037$ | $n_{14} = 1.72$ | $\nu_{14} = 50.25$ |
| $r_{26} = -9.3973$ | | |
| $d_{26} = 0.645$ | $n_{15} = 1.7495$ | $\nu_{15} = 35.27$ |
| $r_{27} = 51.907$ | | |
| $d_{27} = 15.7325$ | | |
| $r_{28} = \infty$ (flare stop) | | |
| $d_{28} = 1.3822$ | | |
| $r_{29} = \infty$ | | |
| $d_{29} = 21.9773$ | $n_{16} = 1.54869$ | $\nu_{16} = 45.55$ |
| $r_{30} = \infty$ | | |
| $d_{30} = 0.0921$ | | |
| $r_{31} = \infty$ | | |
| $d_{31} = 0.9215$ | $n_{17} = 1.52287$ | $\nu_{17} = 59.9$ |
| $r_{32} = \infty$ | | |
| $d_{32} = 5.4367$ | | |
| $r_{33} = \infty$ | | |
| $d_{33} = 1.3822$ | $n_{18} = 1.51633$ | $\nu_{18} = 64.15$ |
| $r_{34} = \infty$ | | |
| $d_{34} = 10.0349$ | | |
| $r_{35} = \infty$ | | |
| $d_{35} = 0.3686$ | $n_{19} = 1.51633$ | $\nu_{19} = 64.15$ |
| $r_{36} = \infty$ | | |

| | | | |
|---|---|---|---|
| f | $-124.214$ | 12.231 | 3.767 |
| $D_1$ | 2.975 | 0.535 | 3.036 |
| $D_2$ | 1.641 | 8.132 | 12.178 |
| $D_3$ | 13.085 | 9.034 | 2.487 |

$\beta_{12}(W) = -7.3713$, $\beta_{12}(S) = -7.4110$
$\beta_{12}(T) = -7.3908$
$\beta_3(W) = -0.62332$, $\beta_3(S) = -1.00198$
$\beta_3(T) = -1.61416$
$\beta_4 = -1.7795$, $f_1 = -10.699$, $f_4 = 19.085$
$\epsilon = 1.736° \sim 1.542°$, $\epsilon' = -0.265° \sim -2.858°$
$\theta = 0.005°$

Embodiment 8

$f = -7.2657 \sim 7.57723$
image height $1.03 \sim 2.68$
object point $0.3688$

| | | |
|---|---|---|
| $r_1 = \infty$ | | |
| $d_1 = 0.6146$ | $n_1 = 1.51633$ | $\nu_1 = 64.15$ |
| $r_2 = \infty$ | | |
| $d_2 = 1.5240$ | | |
| $r_3 = -74.6155$ | | |
| $d_3 = 1.2293$ | $n_2 = 1.51823$ | $\nu_2 = 58.96$ |
| $r_4 = -4.0566$ | | |
| $d_4 = 0.3811$ | | |
| $r_5 = 7.0093$ | | |
| $d_5 = 1.3522$ | $n_3 = 1.62230$ | $\nu_3 = 53.20$ |
| $r_6 = -7.0093$ | | |
| $d_6 = 0.6761$ | | |
| $r_7 = -8.8766$ | | |
| $d_7 = 1.0941$ | $n_4 = 1.74$ | $\nu_4 = 28.29$ |
| $r_8 = 2.9552$ | | |

-continued

| | | |
|---|---|---|
| $d_8 = 2.2373$ | $n_5 = 1.53256$ | $\nu_5 = 45.91$ |
| $r_9 = -11.8071$ | | |
| $d_9 = 2.9134$ | | |
| $r_{10} = -23.0488$ | | |
| $d_{10} = 1.8193$ | $n_6 = 1.53256$ | $\nu_6 = 45.91$ |
| $r_{11} = -6.8864$ | | |
| $d_{11} = 0.6023$ | | |
| $r_{12} = \infty$ (aperture stop) | | |
| $d_{12} = D_1$ (variable) | | |
| $r_{13} = 19.9781$ | | |
| $d_{13} = 4.7819$ | $n_7 = 1.51633$ | $\nu_7 = 64.15$ |
| $r_{14} = -19.9781$ | | |
| $d_{14} = 2.4585$ | $n_8 = 1.5927$ | $\nu_8 = 35.29$ |
| $r_{15} = \infty$ | | |
| $d_{15} = D_2$ (variable) | | |
| $r_{16} = -66.8170$ | | |
| $d_{16} = 1.2293$ | $n_9 = 1.6968$ | $\nu_9 = 55.52$ |
| $r_{17} = 5.0867$ | | |
| $d_{17} = 1.8439$ | $n_{10} = 1.834$ | $\nu_{10} = 37.16$ |
| $r_{18} = 9.5182$ | | |
| $d_{18} = D_3$ (variable) | | |
| $r_{19} = 47.2753$ | | |
| $d_{19} = 3.0732$ | $n_{11} = 1.6968$ | $\nu_{11} = 55.52$ |
| $r_{20} = -7.0683$ | | |
| $d_{20} = 1.2293$ | $n_{12} = 1.834$ | $\nu_{12} = 37.16$ |
| $r_{21} = -15.1938$ | | |
| $d_{21} = 6.8839$ | | |
| $r_{22} = \infty$ | | |
| $d_{22} = 21.5121$ | $n_{13} = 1.54869$ | $\nu_{13} = 45.55$ |
| $r_{23} = \infty$ | | |
| $d_{23} = 0.7376$ | | |
| $r_{24} = \infty$ | | |
| $d_{24} = 1.9668$ | $n_{14} = 1.514$ | $\nu_{14} = 73.00$ |
| $r_{25} = \infty$ | | |
| $d_{25} = 0.0615$ | | |
| $r_{26} = \infty$ | | |
| $d_{26} = 1.2293$ | $n_{15} = 1.52287$ | $\nu_{15} = 59.89$ |
| $r_{27} = \infty$ | | |
| $d_{27} = 13.1827$ | | |
| $r_{28} = \infty$ | | |
| $d_{28} = 0.4917$ | $n_{16} = 1.51633$ | $\nu_{16} = 64.15$ |
| $r_{29} = \infty$ | | |
| f  $-7.2657$ | $-20.409$ | $7.57723$ |
| $D_1$  3.968 | 0.714 | 4.050 |
| $D_2$  2.190 | 10.848 | 16.246 |
| $D_3$  17.456 | 12.052 | 3.318 |
| $\beta_{12}(W) = -7.39129,$ | $\beta_{12}(S) = -7.41101$ | |
| $\beta_{12}(T) = -7.39079$ | | |
| $\beta_3(W) = -0.6232$ | $\beta_3(S) = -1.00198$ | |
| $\beta_3(T) = -1.61415$ | | |
| $\beta_4 = -0.90582,$ | $f_3 = -14.27340$ | |
| $f_4 = 20.23261$ | | |
| $\epsilon = 1.72°$ | $\epsilon' = 1.15° \sim 1.72°$ | |
| $\theta = 2.24°$ | | | wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

Figure 7:
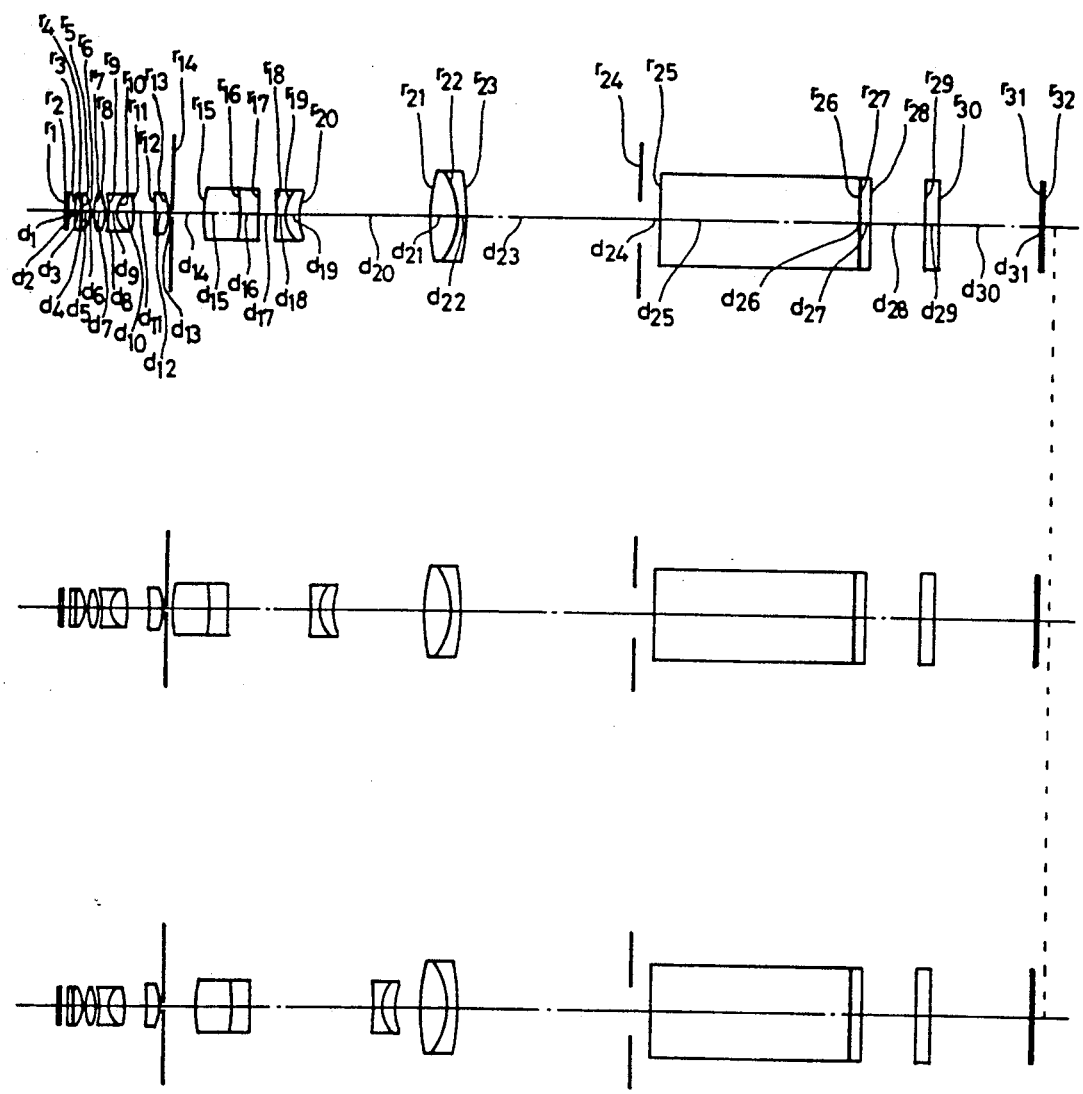
FIG. 7 through FIG. 14 show sectional views illustrating compositions of Embodiments 1 through 8 of the imaging optical system according to the present invention.

The Embodiment 1 has the composition illustrated in FIG. 7 wherein the plane parallel plate ($d_3$) arranged at the second location as counted from the object side plane parallel plate ($d_{25}$) arranged on the image side of the flare stop ($r_{24}$) are designed as optical low pass filters made of quartz. Out of these filters, the quartz filter arranged on the object side ($d_3$) determines the cut-off frequency corresponding to the sampling frequency or Nyquist frequency of the image guide, whereas the quartz filter arranged on the image side ($d_{25}$) determines the cut-off frequency corresponding to the Nyquist frequency of the image pickup device. These quartz filters may be integrated into a filter unit which is replaceable with other filter units.

In the Embodiment 1, the first lens unit comprises a positive lens component, a positive lens component and a positive cemented lens component so as to correct aberrations independently in the first lens unit. It is therefore possible to modify the imaging optical system preferred as the Embodiment 1 so to be combinable with a different type of image guide by replacing the first lens unit with a different type of lens unit. Further, the Embodiment 1 is compatible with multi-component types of image guides or quartz types of image guides.

Furthermore, since the Embodiment 1 is designed for arrangement in a camera control unit and is not equipped with an eyepiece lens nor adapter, relatively loose restrictions are imposed on the total length and outside diameter thereof, thereby making it easy to correct aberrations in the Embodiment 1. In addition, the Embodiment 1 constitutes no hindrance to observation through an eyepiece lens even for an unskilled observer and is free from the tediousness to attach to an adapter.

Figure 17:
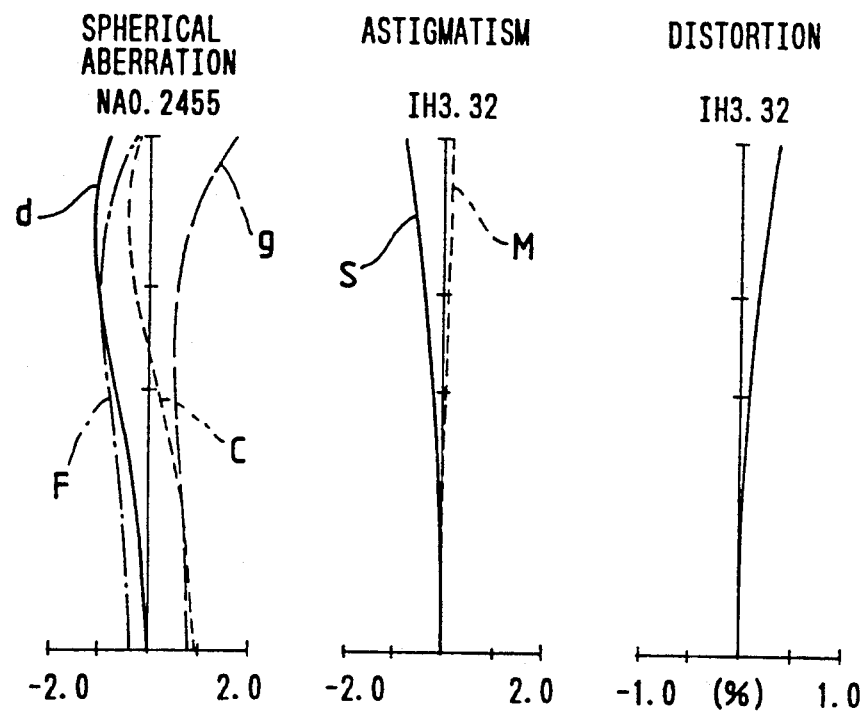

Aberration characteristics at the wide position, intermediate focal length and tele position of the Embodiment 1 are illustrated in FIG. 15, FIG. 16 and FIG. 17 respectively.

Figure 8:
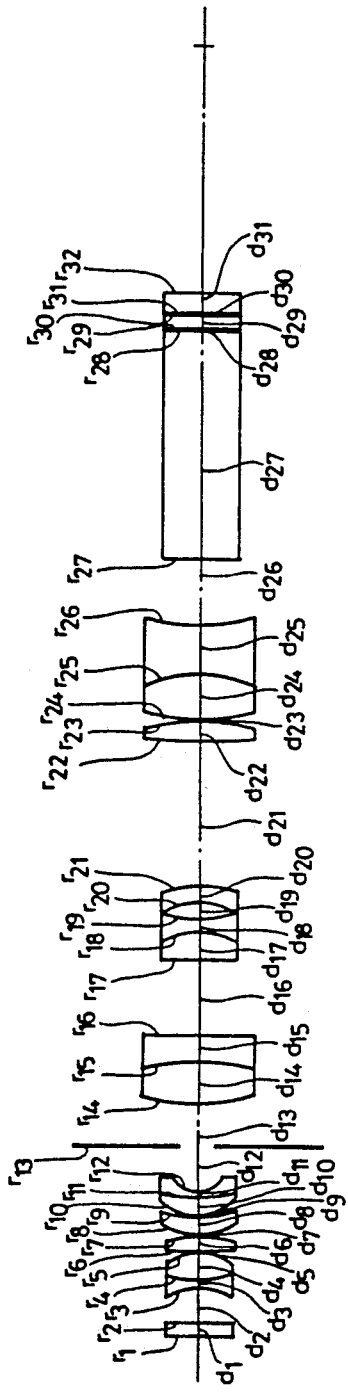
Figure 18:
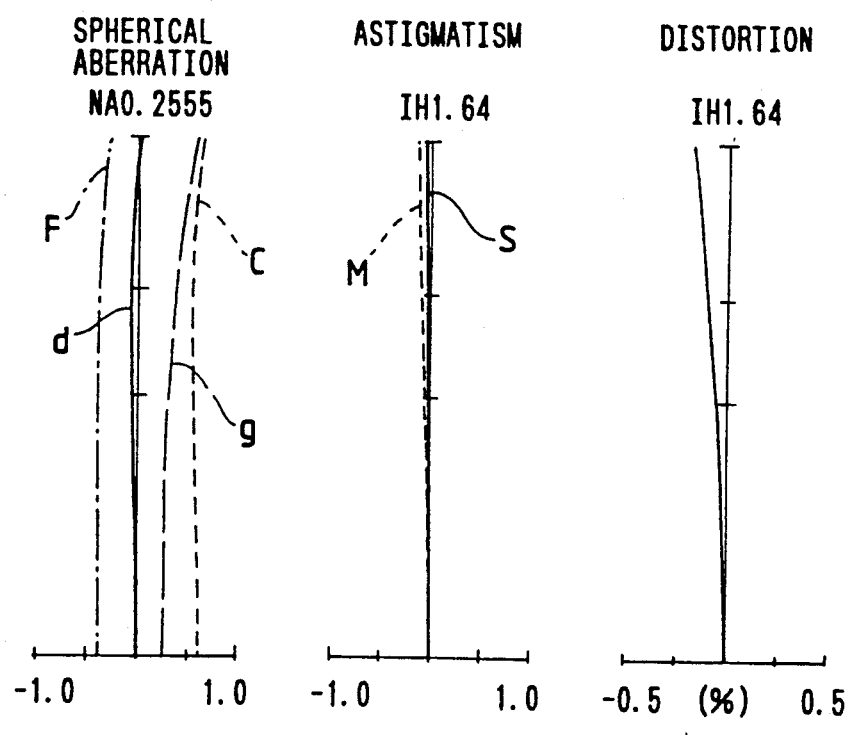
FIG. 18 through FIG. 20 show graphs illustrating aberration characteristics of the Embodiment 2 of the present invention.
Figure 19:
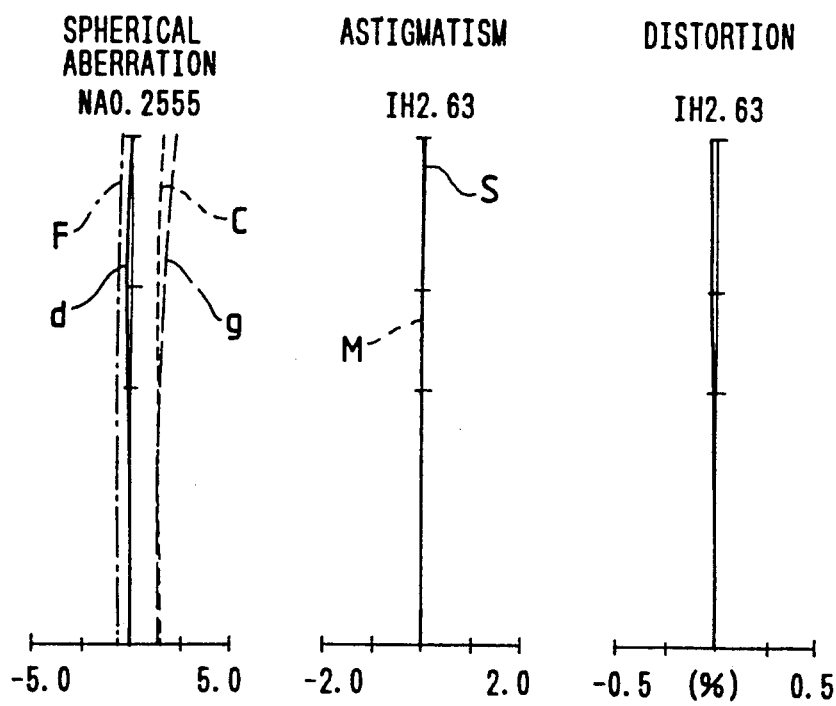
Figure 20:
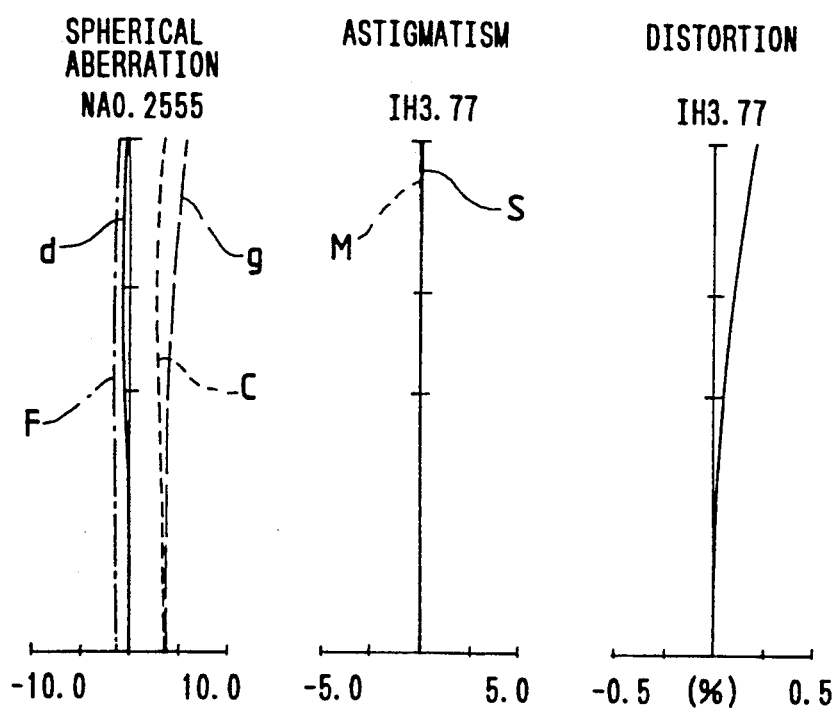

The Embodiment 2 has the composition illustrated in FIG. 8. Aberration characteristics at the wide position, intermediate focal length and tele position of the Embodiment 2 are visualized in FIG. 18, FIG. 19 and FIG. 20 respectively.

Figure 9:
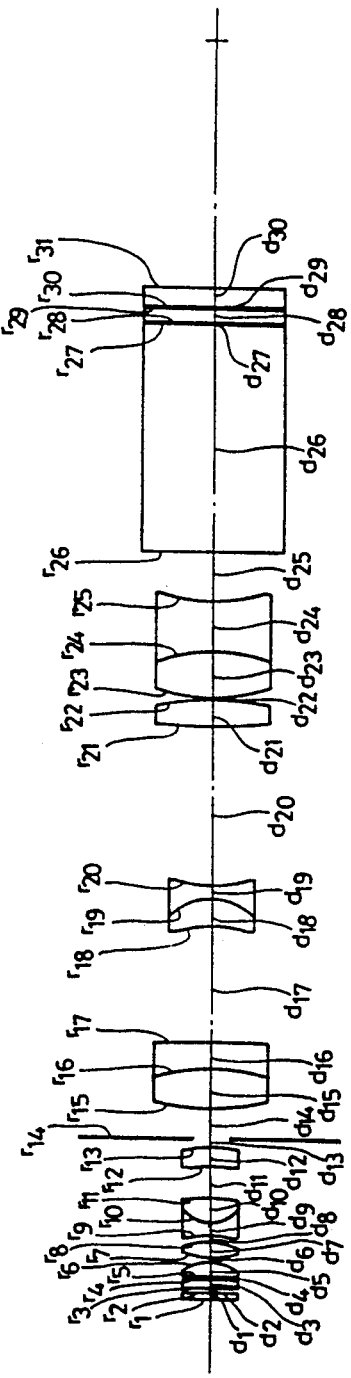
Figure 21:
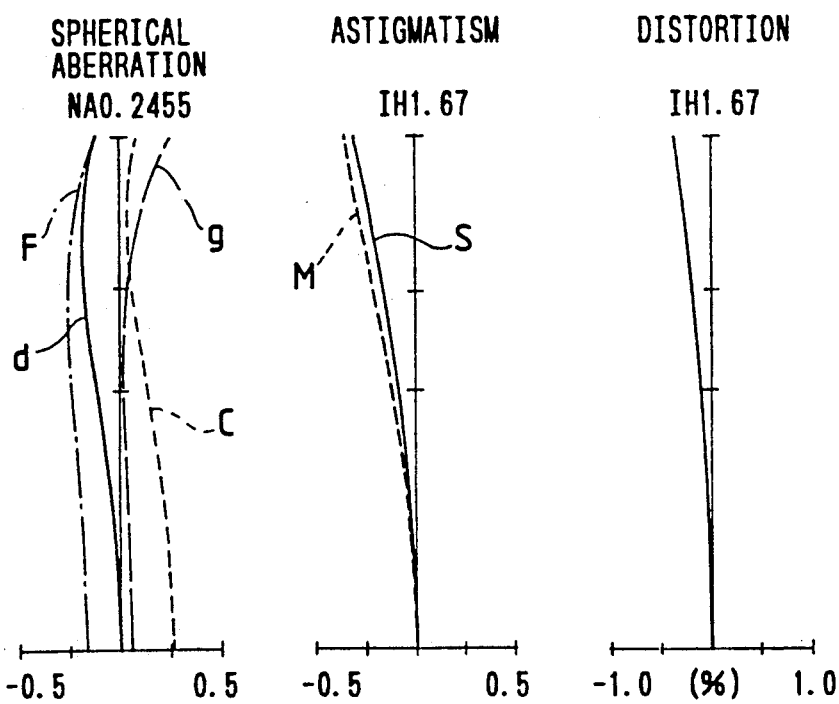
FIG. 21 through FIG. 23 shows curves illustrating aberration characteristics of the Embodiment 3 of the present invention.
Figure 22:
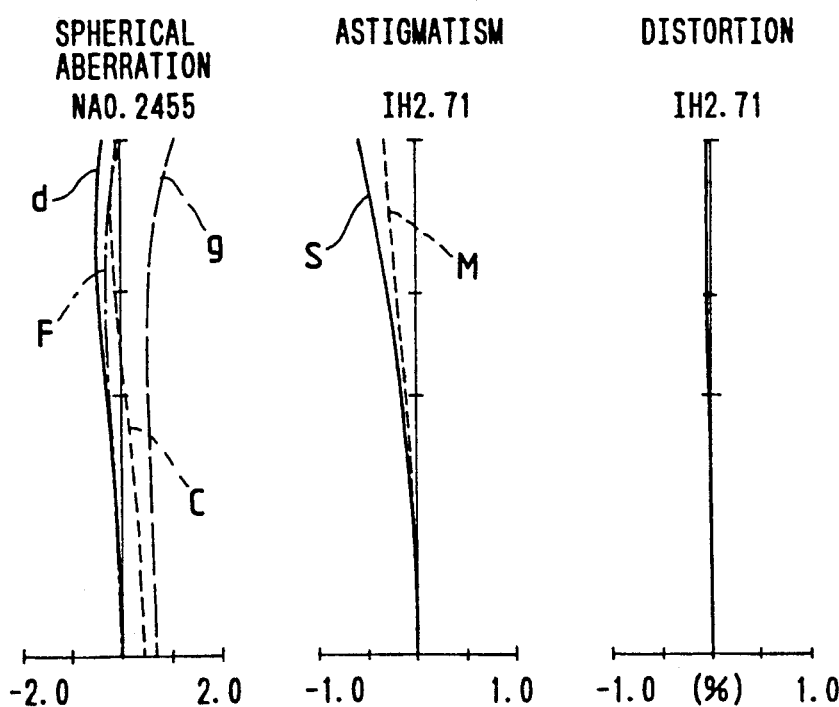
Figure 23:
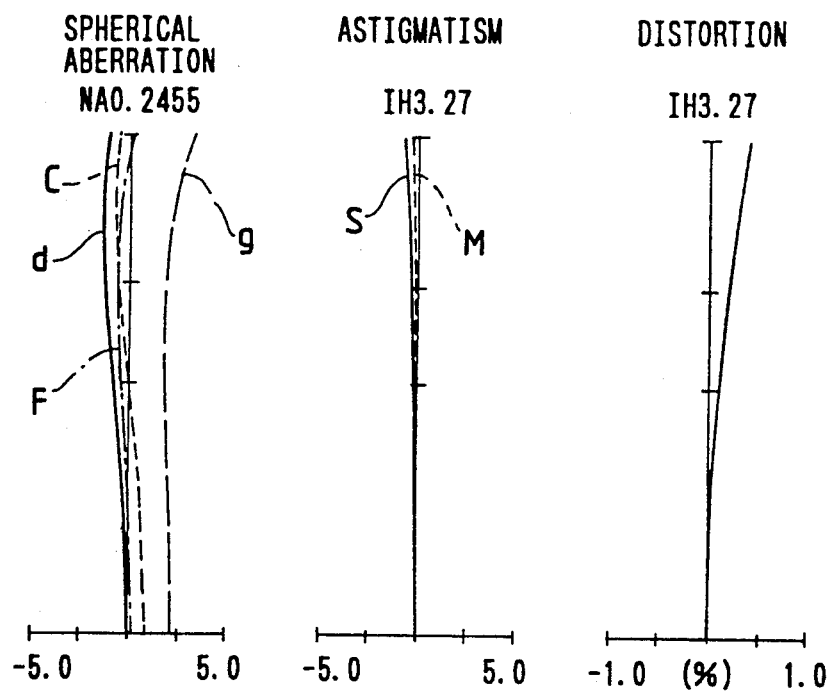

The Embodiment 3 has the composition shown in FIG. 9. At the wide position, intermediate focal length and tele position, the Embodiment 3 has the aberration characteristics visualized in FIG. 21, FIG. 22 and FIG. 23 respectively.

Figure 4:
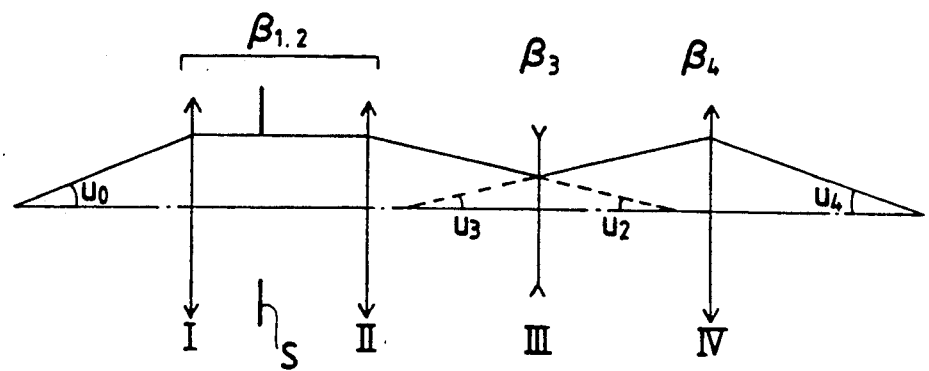
FIG. 4 shows a diagram illustrating the power distribution selected for the imaging optical system according to the present invention.
Figure 5:
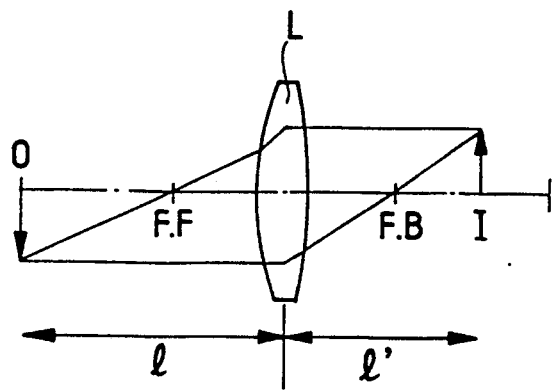
FIG. 5 shows a diagram illustrating the relationship between an object and an image thereof.
Figure 6:
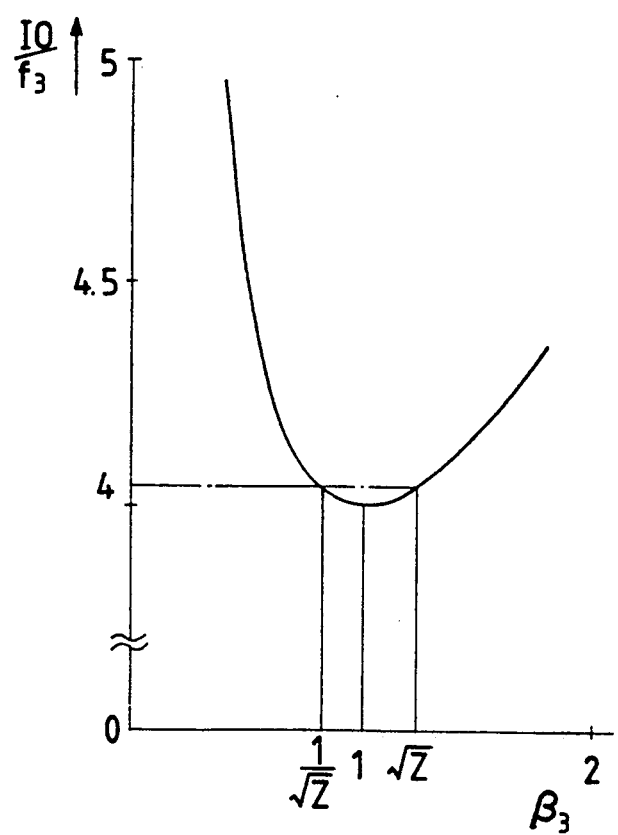
FIG. 6 shows a graph illustrating relationship between magnification and the distance as measured from an object to the image thereof which is variable dependently on movement of the variator.
Figure 10:
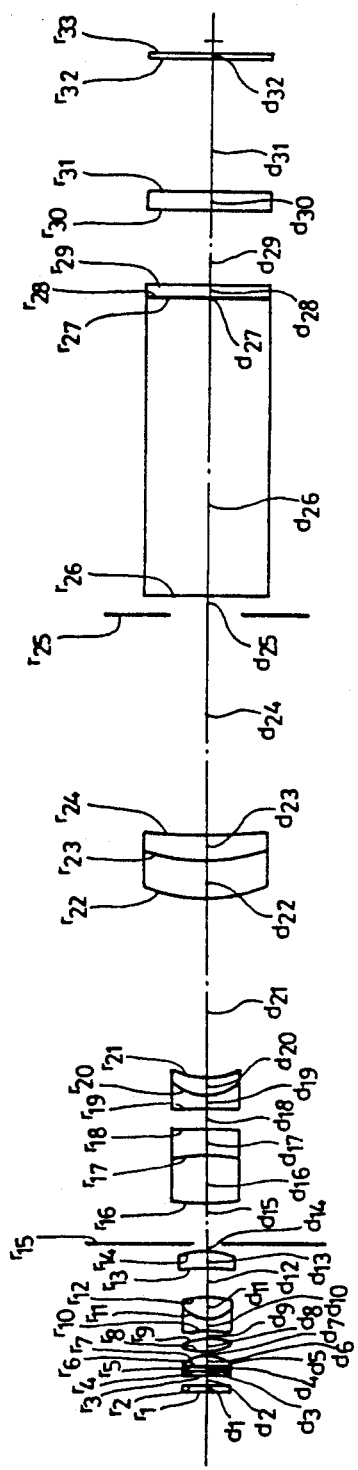
Figure 24:
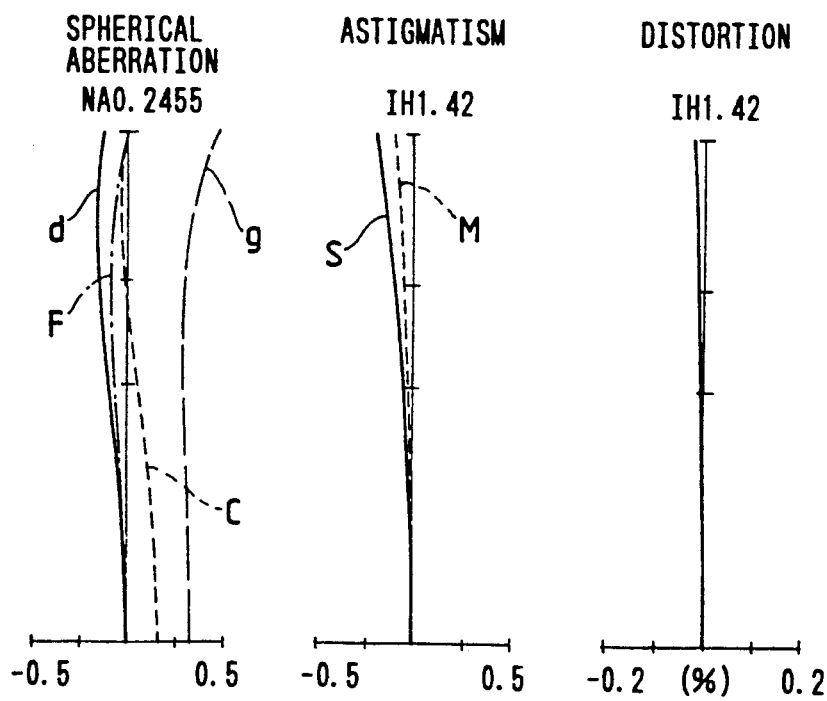
FIG. 24 through FIG. 26 show curves illustrating aberration characteristics of the Embodiment 4 of the present invention.
Figure 25:
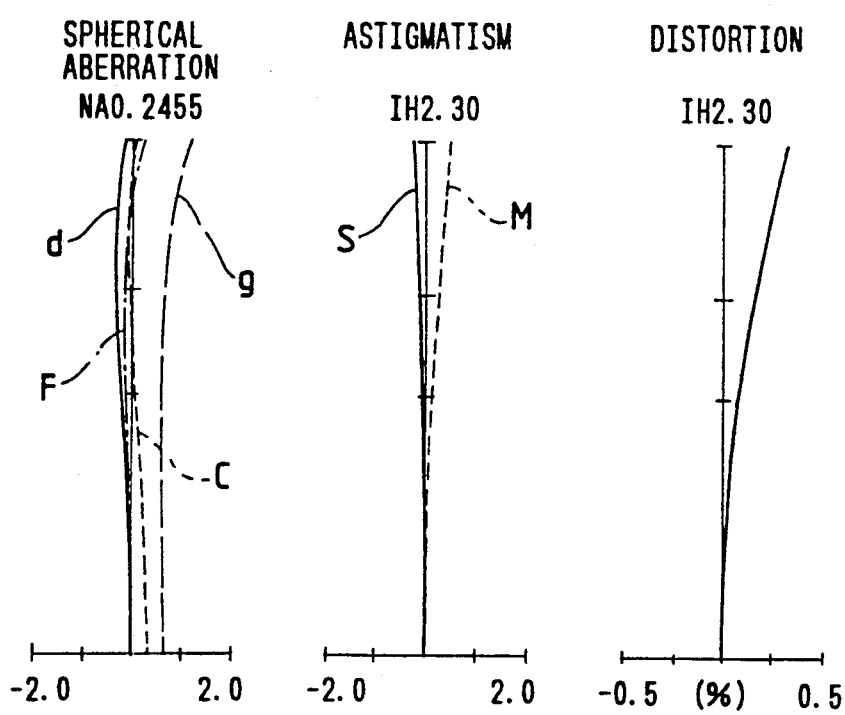
Figure 26:
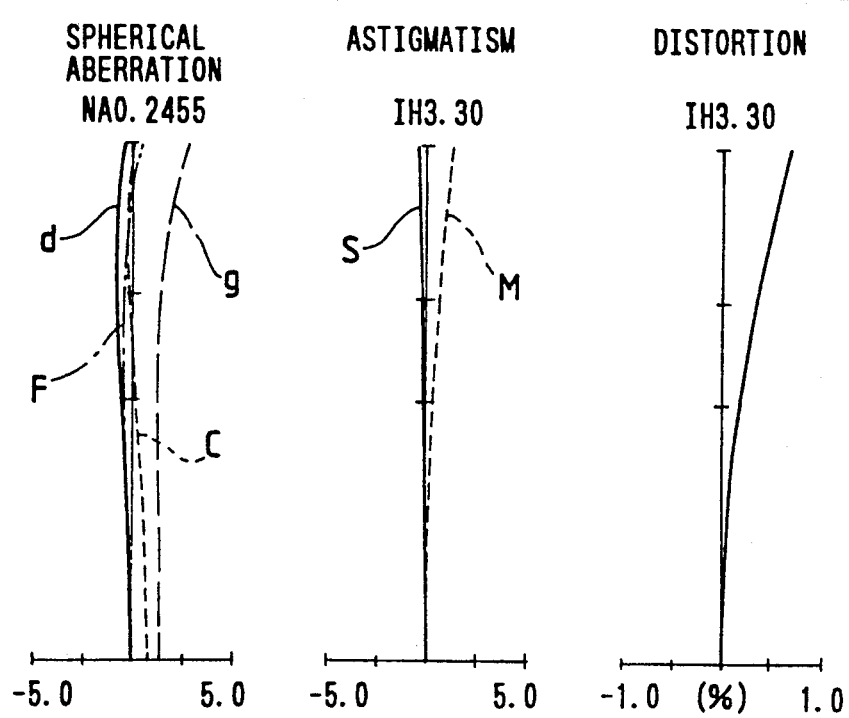

FIG. 4 has the composition illustrated in FIG. 10, and the aberration characteristics shown in FIG. 24, FIG. 25 and FIG. 26 at the wide position, intermediate focal length and tele position respectively.

Figure 11:
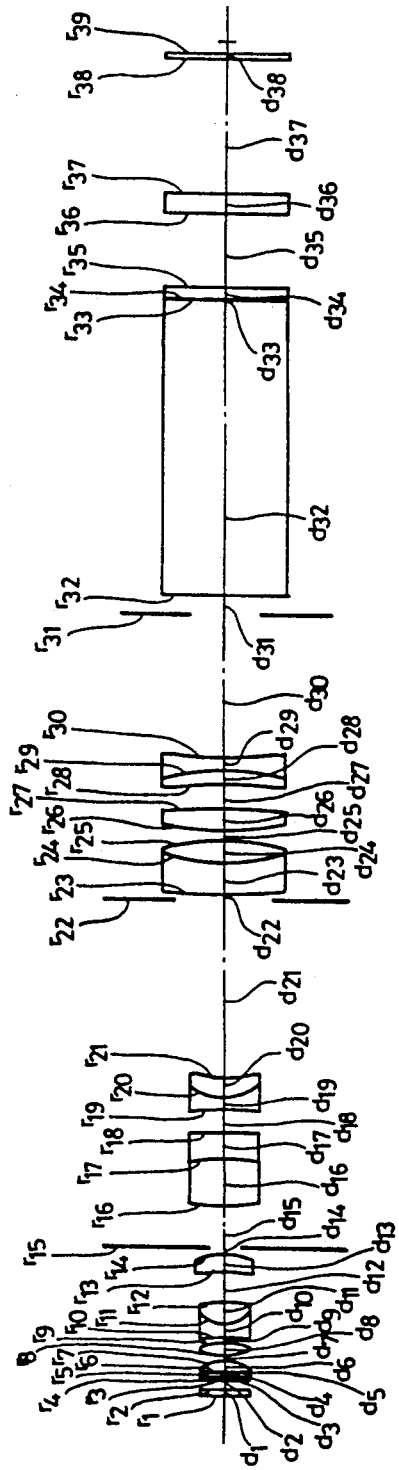
Figure 27:
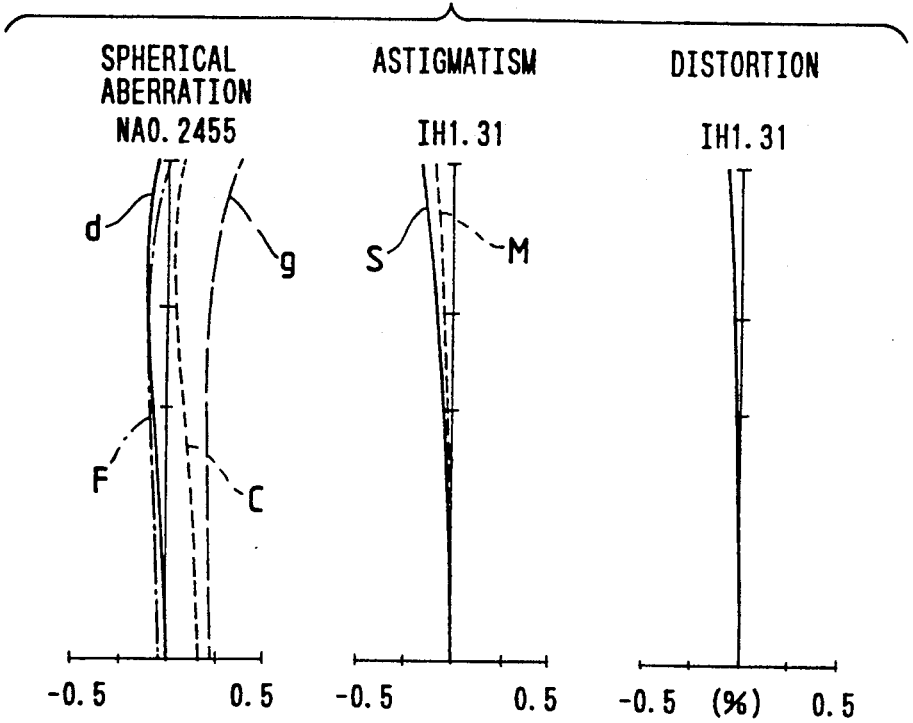
FIG. 27 through FIG. 29 show graphs visualizing aberration characteristics of the Embodiment 5 of the present invention.
Figure 28:
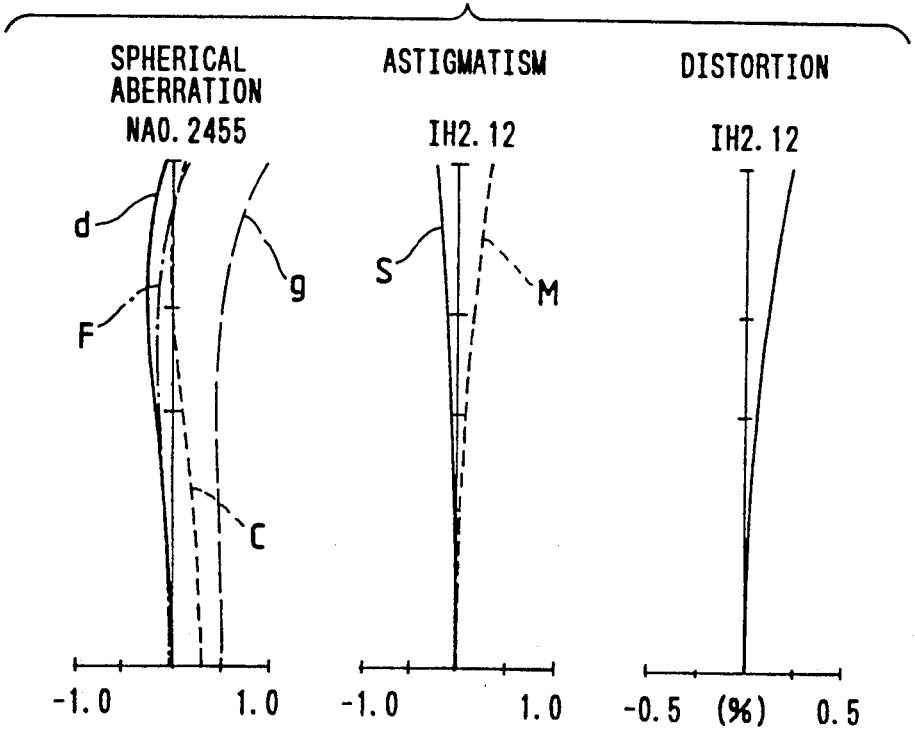
Figure 29:
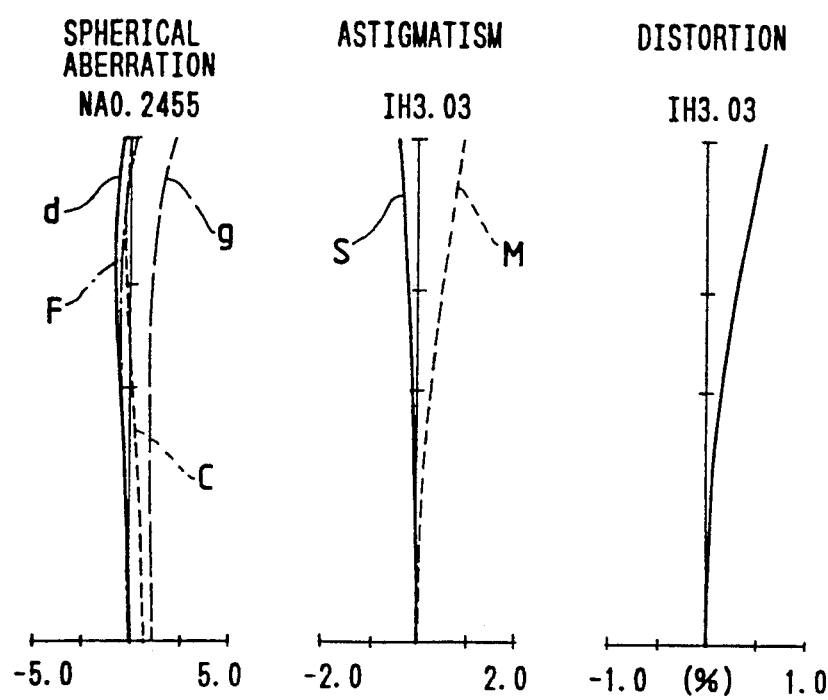

The Embodiment 5 is composed as illustrated in FIG. 11, and has the aberration characteristics shown in FIG. 27, FIG. 28 and FIG. 29 at the wide position, intermediate focal length and tele position respectively.

Figure 12:
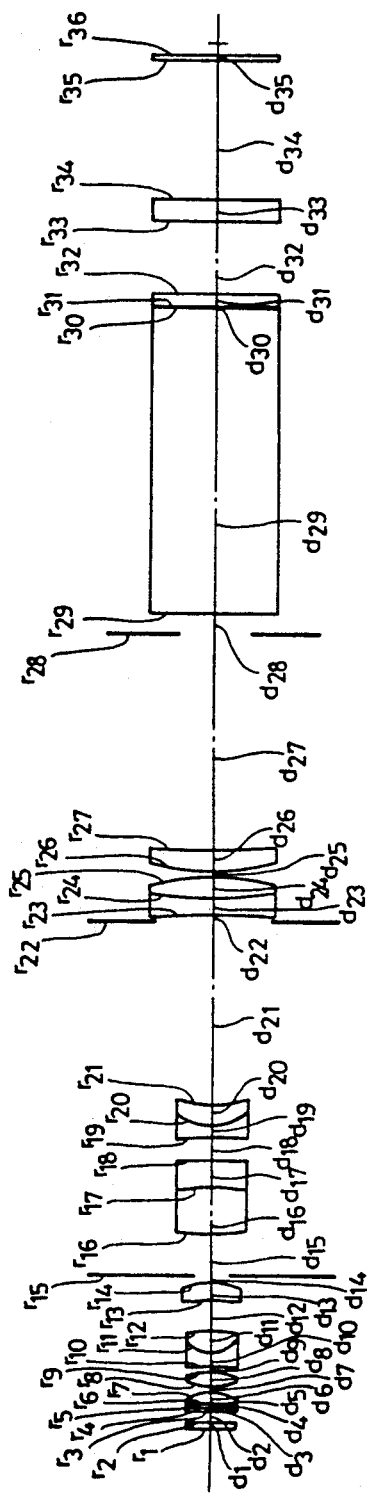
Figure 30:
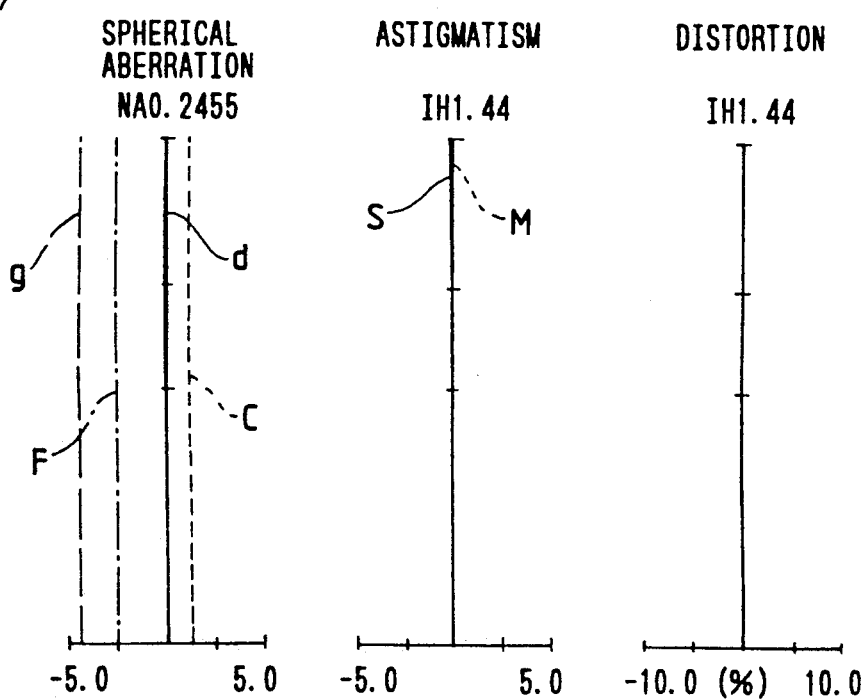
FIG. 30 through FIG. 32 show graphs visualizing aberration characteristics of the Embodiment 6 of the present invention.
Figure 31:
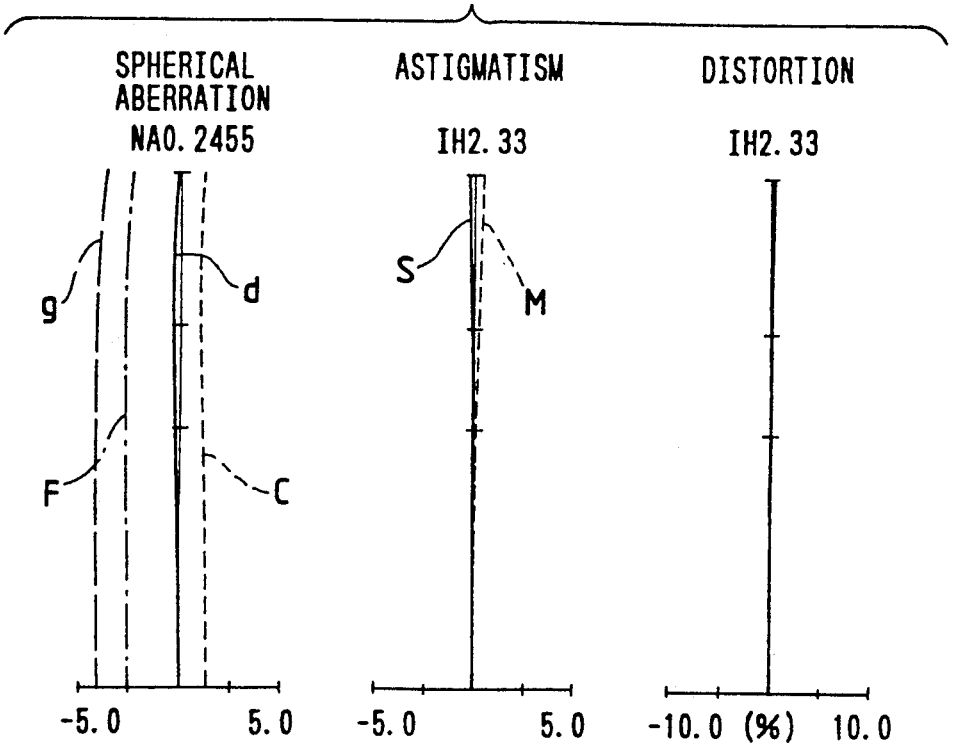
Figure 32:
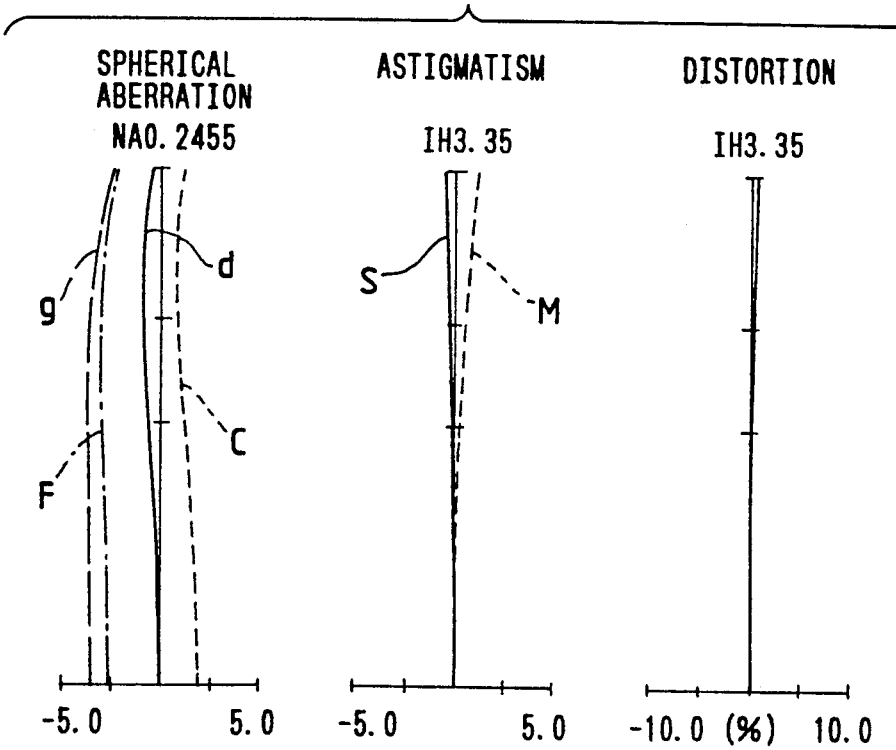

The Embodiment 6 is composed as shown in FIG. 12, and has the aberration characteristics illustrated in FIG. 30, FIG. 31 and FIG. 32 at the wide position, intermediate focal length and tele position respectively.

Figure 13:
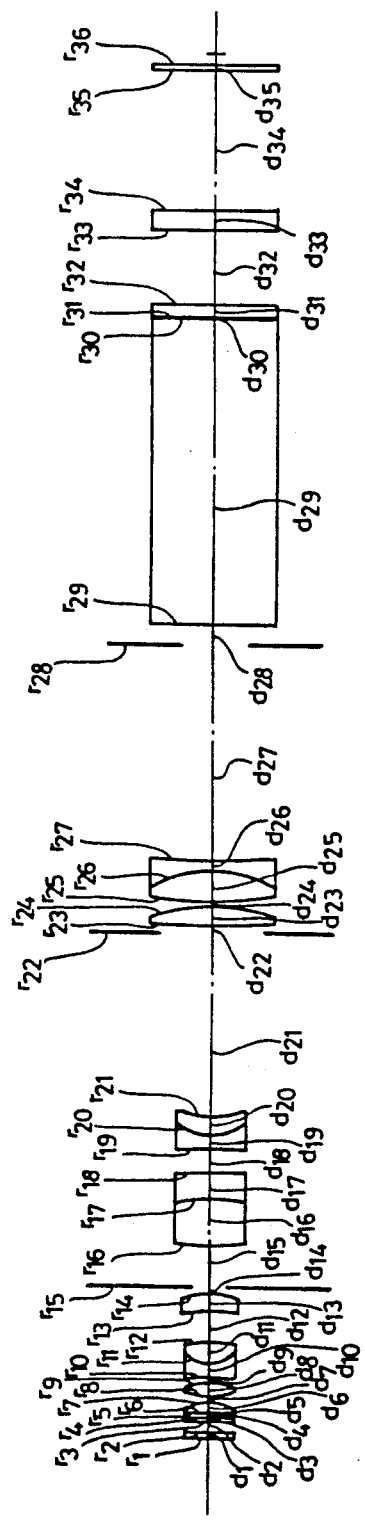
Figure 35:
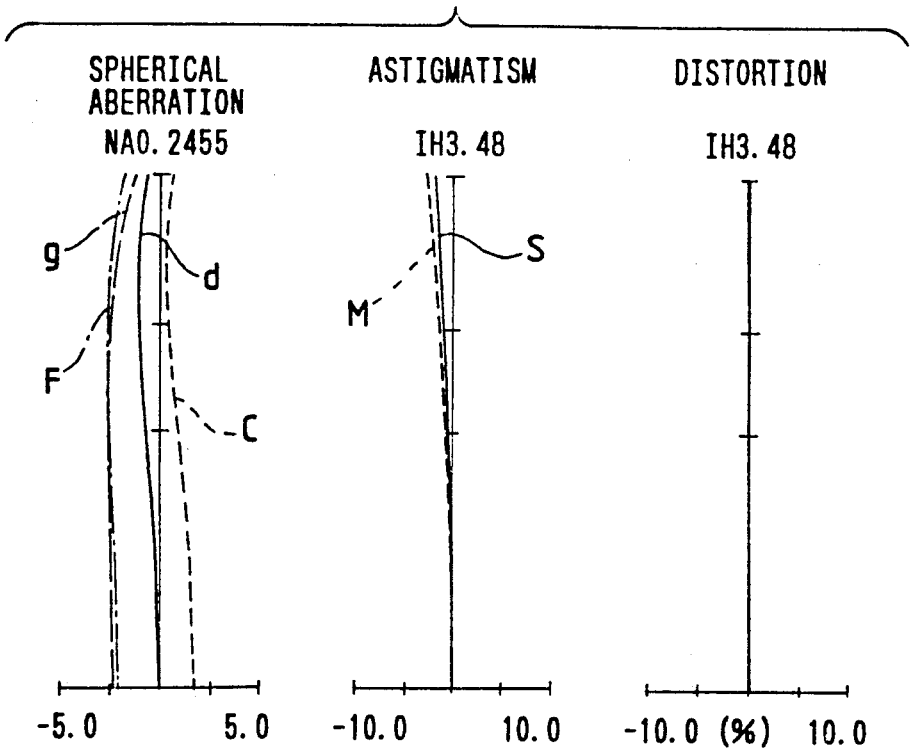

The Embodiment 7 is designed in the composition illustrated in FIG. 13, and has the aberration characteristics shown in FIG. 33, FIG. 34 and FIG. 35 at the wide position, intermediate focal length and tele position respectively.

Figure 14:
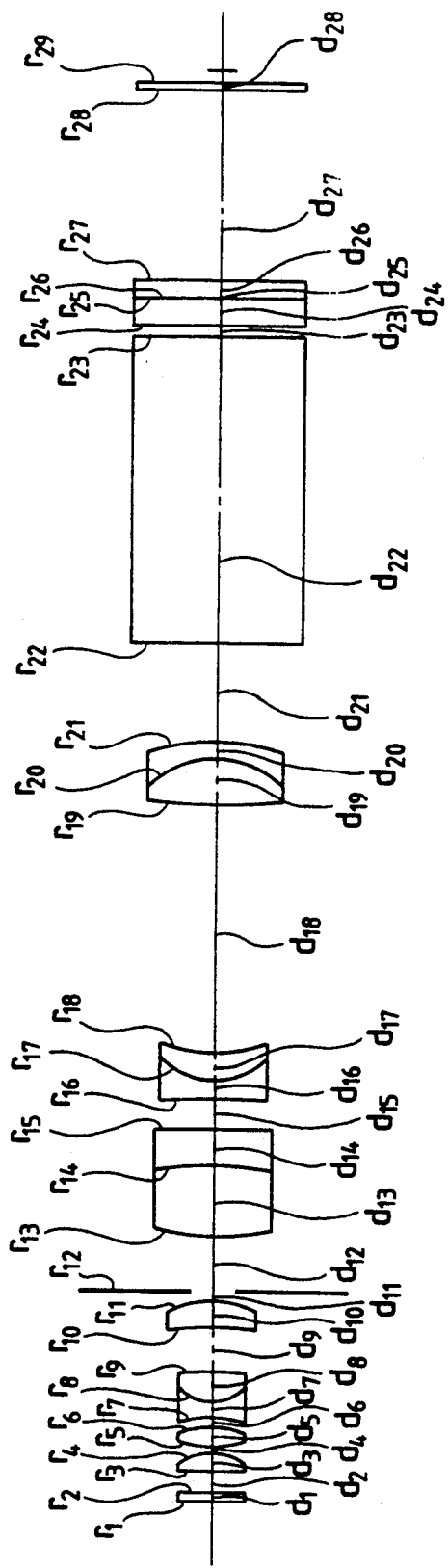
Figure 36:
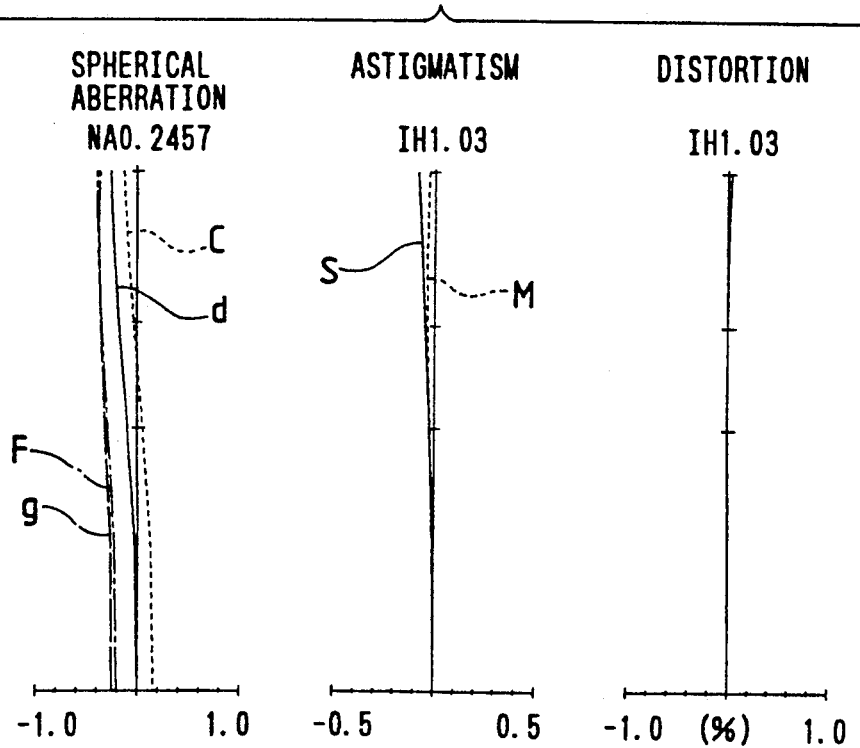
FIG. 36 through FIG. 38 show curves visualizing aberration characteristics of the Embodiment 8 of the present invention.
Figure 37:
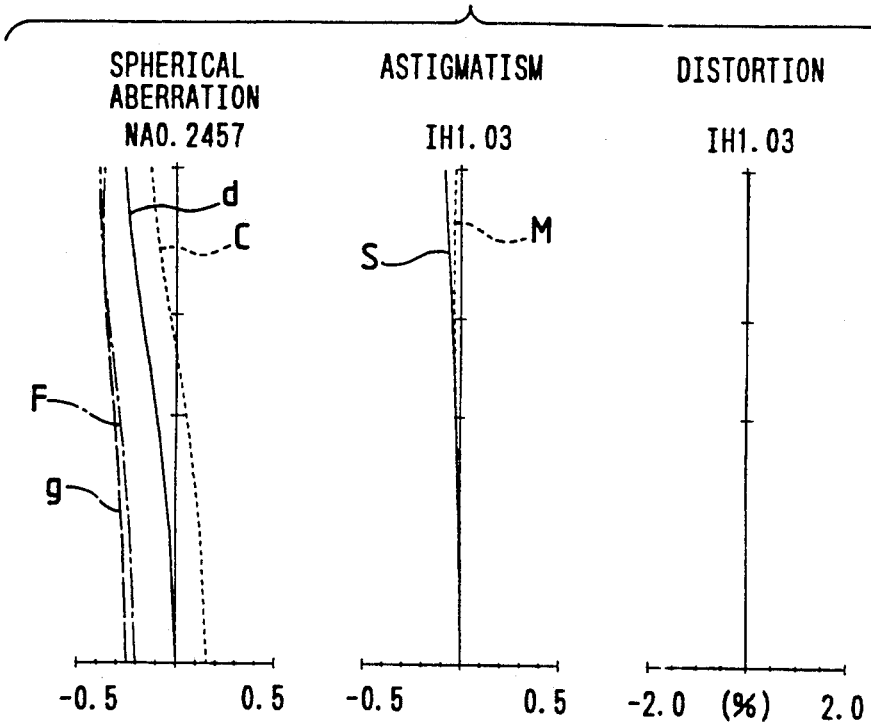
Figure 38:
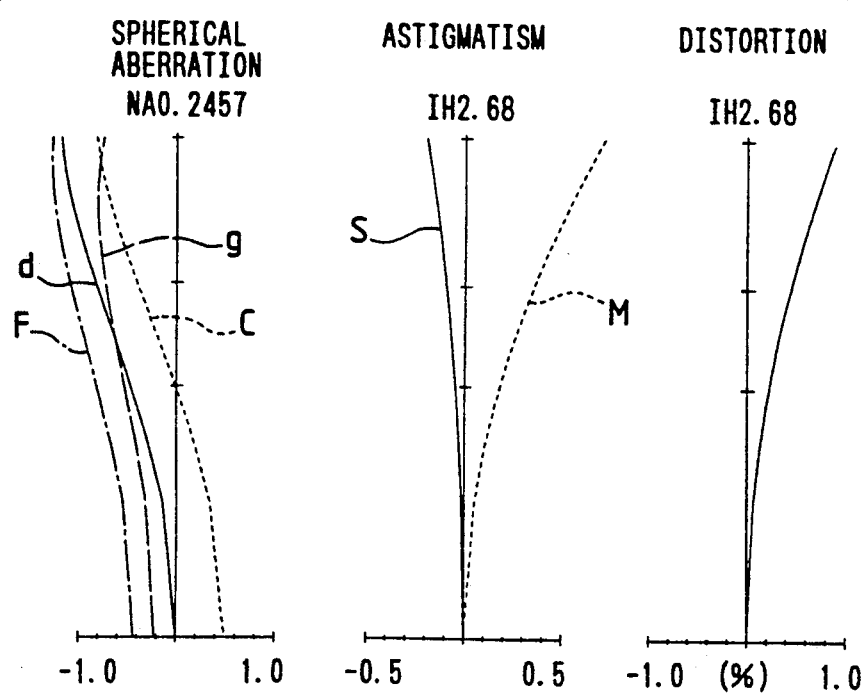

The Embodiment 8 has the composition shown in FIG. 14. Aberration characteristics at the wide position, intermediate focal length and tele position of the Embodiment 8 are visualized in FIG. 36, FIG. 37 and FIG. 38 respectively.

The Embodiment 8 has the composition shown in FIG. 14. Aberration characteristics at the wide position, intermediate focal length and tele position of the Embodiment 8 are visualized in FIG. 36, FIG. 37 and FIG. 38 respectively.

Also in each of the Embodiments 2 through 8 described above, quartz filters are arranged at a location near the object point and another location near the image point respectively. Further, the first lens unit has aberrations corrected sufficiently favorably independently therein and is replaceable with other lens units.

As is understood from the foregoing description, the imaging optical system according to the present invention is designed as a zoom lens system which comprises positive, positive, negative and positive lens units, has a high magnification and a high vari-focal ratio, and is sufficiently usable even when it is combined with a very thin fiber scope such as a blood vessel scope.

What is claimed is:

1. An optical device for photographing an image transmitted through an image guide fiber bundle, comprising:

an image guide fiber bundle; and an imaging lens system for focusing a light beam emerging from said image guide fiber bundle onto an image pickup device;

wherein said imaging lens system includes a first lens unit having a positive refractive power, a second compensator lens unit having a positive refractive power and being movable along an optical axis so as to vary a focal length of said imaging lens system as a whole, a third variator lens unit having a negative refractive power and being movable along an optical axis so as to vary a focal length of said imaging lens system as a whole, and a fourth imaging lens unit having a positive refractive power; and wherein said image guide fiber bundle has an end surface of emergence disposed in the vicinity of a front focal point of said first lens unit.

2. An imaging system according to claim 1 designed so as to satisfy the following condition (1):

$$\beta_{12} < -2 \tag{1}$$

wherein the reference symbol $\beta_{12}$ represents the total imaging magnification of said first lens unit and said second lens unit.

3. An imaging system according to claim 2 designed so as to satisfy the following conditions (2) through (5):

$$|f_3| < 20 \tag{2}$$

$$-6 < \beta_3 < -0.4 \tag{3}$$

$$8 < f_4 < 40 \tag{4}$$

$$-5 < \beta_4 < -0.5 \tag{5}$$

wherein the reference symbols $f_3$ and $f_4$ represent the focal lengths of said third lens unit and said fourth lens unit respectively, and the reference symbols $\beta_3$ and $\beta_4$ designates the magnifications of said third lens unit and said fourth lens unit respectively.

4. An imaging system according to claim 3 designed so as to satisfy the following conditions (6) and (7):

$$|\epsilon| < 15° \tag{6}$$

$$|\epsilon'| < 15° \tag{7}$$

wherein the reference symbol $\epsilon$ represents the inclination angle of the principal ray coming from the maximum object height relative to the optical axis and the reference symbol $\epsilon'$ designates the inclination angle of the principal ray incident on the maximum image height.

5. An imaging system according to claim 4 designed so as to satisfy the following condition (8):

$$|\theta| < 10° \tag{8}$$

wherein the reference symbol $\theta$ represents the inclination angle of the marginal ray relative to the optical axis.

6. An imaging system according to claim 3 wherein an aperture stop is arranged between said first lens unit and said second lens unit.

7. An imaging system according to claim 3 wherein each of said lens units comprises a cemented lens component.

8. An imaging system according to claim 3 wherein said first lens unit comprises a positive lens component, a positive lens component and a positive cemented lens component.

9. An imaging system according to claim 3 wherein said first lens unit is designed so as to be replaceable with another lens unit.

10. An imaging system according to claim 1 or 2 wherein said first lens unit is movable along the optical axis.

11. An imaging system according to claim 1 or 2 wherein a first quartz filter is arranged on the object side of said first lens unit and a second quartz filter is arranged on the image side of said fourth lens unit, said first quartz filter having a cut-off frequency substantially coincident with the repeating frequency of arrangement of the fibers on the end surface of said image guide fiber bundle or ½ of said repeating frequency, and said second quartz filter has a cut-off frequency substantially coincident with the Nyquist frequency of said image pickup device.

12. An imaging system according to claim 11 wherein said first and second quartz filters are replaceable with other quartz filters respectively.

* * * * *